(12) United States Patent
Park et al.

(10) Patent No.: US 11,212,061 B2
(45) Date of Patent: Dec. 28, 2021

(54) QOS CONTROL DEVICE IN MULTI-WIRELESS NETWORK ENVIRONMENT FOR VIDEO TRANSMISSION AND A CONTROLLING METHOD THEREOF

(71) Applicant: SAMSUNG ELECTRONICS CO., LTD., Suwon-si (KR)

(72) Inventors: Sunho Park, Suwon-si (KR); Junghyun Park, Suwon-si (KR); Joonyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/545,087

(22) Filed: Aug. 20, 2019

(65) Prior Publication Data
US 2020/0092074 A1    Mar. 19, 2020

(30) Foreign Application Priority Data
Sep. 13, 2018  (KR) ........................ 10-2018-0109477

(51) Int. Cl.
*H04L 5/00* (2006.01)
*H04W 28/20* (2009.01)
(Continued)

(52) U.S. Cl.
CPC .......... *H04L 5/0094* (2013.01); *H04L 5/0046* (2013.01); *H04N 21/43637* (2013.01);
(Continued)

(58) Field of Classification Search
CPC ... H04L 5/0094; H04L 5/0046; H04L 1/1838; H04L 1/1861; H04L 1/1893;
(Continued)

(56) References Cited

U.S. PATENT DOCUMENTS 9,529,761 B2  12/2016 Kawai
10,084,831 B2  9/2018 Park et al.
(Continued)

FOREIGN PATENT DOCUMENTS

EP    2 600 644 A1   6/2013
EP    3 076 609 A1  10/2016
(Continued)

OTHER PUBLICATIONS

Enabling Seamless WiGig/WiFi Handovers in Tri-band Wireless Systems. Yao-Yu Li, Chi-Yu Li, Wei-Han Chen, Chia-Jui Yeh, Kuochen Wang Department of Computer Science, National Chiao Tung University, Hsinchu, Taiwan. IEEE 2017; Date of Conference: Oct. 10-13, 2017. (Year: 2017).*
(Continued)

*Primary Examiner* — Hassan A Phillips
*Assistant Examiner* — Mohammed S Chowdhury
(74) *Attorney, Agent, or Firm* — Sughrue Mion, PLLC

(57) ABSTRACT

Disclosed is an electronic device performing a video transmission using a multi-wireless network and a controlling method thereof. The electronic device for receiving and reproducing contents includes: a communicator, and a processor to receive, from an external device, a signal including original data of contents through a main frequency band, and receive, from an external device through at least one sub frequency band, a connection state signal including information on original data, and control the communicator to transmit, to the external device through the main frequency band and the at least one sub frequency band, a response signal including information on whether original data is missing, and an amount of received data stored in a buffer.

20 Claims, 23 Drawing Sheets

(51) Int. Cl.
*H04N 21/4363* (2011.01)
*H04W 76/15* (2018.01)
*H04W 72/04* (2009.01)

(52) U.S. Cl.
CPC ....... *H04W 28/20* (2013.01); *H04W 72/0453* (2013.01); *H04W 76/15* (2018.02)

(58) Field of Classification Search
CPC ... H04L 1/1819; H04L 1/1671; H04L 5/0044; H04L 5/0005; H04L 1/0017; H04W 28/20; H04W 76/15; H04W 72/0453; H04N 21/43637; H04N 21/00; H04N 21/4381; H04N 21/4382; H04N 21/2383
See application file for complete search history.

(56) References Cited

U.S. PATENT DOCUMENTS

| | | | |
|---|---|---|---|
| 2011/0070842 A1* | 3/2011 | Kwon | H04W 72/0453 455/67.13 |
| 2013/0279618 A1 | 10/2013 | Loh et al. | |
| 2014/0269763 A1 | 9/2014 | Gantman et al. | |
| 2016/0269957 A1 | 9/2016 | Cho et al. | |
| 2016/0270075 A1* | 9/2016 | Huang | H04W 72/0446 |
| 2017/0105216 A1* | 4/2017 | Jung | H04W 72/02 |
| 2017/0111244 A1* | 4/2017 | Strater | H04W 48/20 |
| 2017/0171360 A1 | 6/2017 | Phillips et al. | |
| 2019/0069208 A1* | 2/2019 | Pefkianakis | H04W 36/14 |
| 2019/0373439 A1* | 12/2019 | Abouelseoud | H04W 76/14 |

FOREIGN PATENT DOCUMENTS

| | | |
|---|---|---|
| JP | 2015-161986 | 9/2015 |
| KR | 10-1063410 B1 | 9/2011 |
| KR | 10-1243737 B1 | 3/2013 |
| KR | 10-2015-0045639 A | 4/2015 |
| KR | 10-2015-0132240 A | 11/2015 |
| KR | 10-1735435 B1 | 5/2017 |

OTHER PUBLICATIONS

WiFi Assisted Multi-WiGig AP Coordination for Future Multi-Gbps WLANs; Ehab Mahmoud Mohamed, Hideyuki Kusano,Kei Sakaguchi, and Seiichi Sampei,Graduate School of Engineering, Osaka University, Osaka, Japan. Electrical Engineering Dept., Aswan University, Aswan, Egypt.; IEEE 2015. (Year: 2015).*

Millimeter Wave Beamforming Based on WiFi Fingerprinting in Indoor Environment; Ehab Mahmoud Mohamed, Kei Sakaguchi, and Seiichi Sampei, Graduate School of Engineering, Osaka University, Electrical Engineering Dept., Aswan University. IEEE 2015 (Year: 2015).*

Daewon Song et al., "QoS Guaranteed Scalable Video Transmission Over MIMO Systems With Time-Varying Channel Capacity", ICME 2007, IEEE, 2007, pp. 1215-1218.

International Search Report (PCT/ISA/210) dated Nov. 27, 2019 issued by the International Searching Authority in International Application No. PCT/KR2019/010345.

Written Opinion (PCT/ISA/237) dated Nov. 27, 2019 issued by the International Searching Authority in International Application No. PCT/KR2019/010345.

Yao-Yu Li et al., "Enabling Seamless WiGig/WiFi Handovers in Tri-band Wireless Systems", Oct. 2017, 2017 IEEE 25th International Conference on Network Protocols (ICNP), 2 pages total.

Communication dated Jul. 15, 2021, issued by the European Patent Office in counterpart European Application No. 19860044.7.

Umehira et al., "Feasibility of RSSI Based Access Network Detection for Multi-band WLAN Using 2.4/5GHz and 60GHz," 17th International Symposium on Wireless Personal Multimedia Communications (WPMC2014), 2014, total 6 pages, XP 055821247.

* cited by examiner

QOS CONTROL DEVICE IN MULTI-WIRELESS NETWORK ENVIRONMENT FOR VIDEO TRANSMISSION AND A CONTROLLING METHOD THEREOF

CROSS-REFERENCE TO RELATED APPLICATION(S)

This application is based on and claims priority under 35 U.S.C. § 119 to Korean Patent Application No. 10-2018-0109477, filed on Sep. 13, 2018, in the Korean Intellectual Property Office, the disclosure of which is incorporated by reference herein in its entirety.

BACKGROUND

1. Field

The disclosure relates to an electronic device performing video transmission using a multi-wireless network and a controlling method thereof, and more particularly, a video transmission in which high quality video is reproduced without disconnection using a network by efficiently transmitting a video using different wireless networks of two or more types.

2. Description of Related Art

Wi-Fi refers to an enabling technology that provides a network wirelessly using frequencies in a 2.4 GHz band and a 5 GHz band. A regular Wi-Fi network includes a terminal to be connected to a network, and an access point (AP) that is connected to a wired network, manages access terminals within a coverage area, and provides Internet connectivity or the like.

WiGig (802. 11ad) is a standard relatively recently defined that uses a millimeter wave (mmWave) in a 60 GHz band. The mmWave requires a line of sight (LOS) environment in which an access point (AP) and an antenna of the terminal need to face each other without an obstacle. The 60 GHz band is relatively less affected by interference, as the number of technologies used in common is relatively small, and may achieve high data transmission rates (about 4.3 Gbps) using a wide bandwidth. However, in an environment where the LOS is not guaranteed (non-line-of-sight (NLOS)), communication may not be normally performed or the data transmission rate may be very low.

In a related art wireless network, Wi-Fi in which 2.4 GHz frequency band (802.11n) and 5 GHz frequency band (802.11ac) are used, and WiGig in which 60 GHz frequency band is used are divided by separate networks and independently set up. Thus, when an actual video transmission system is established and utilized, only one type of network is used.

In the case of Wi-FI, multiple antennas are used and a relatively high bandwidth may be provided, but 2.4 GHz and 5 GHz bands are bands that may be freely used without permission. Therefore, there is a problem in that the data transmission rate is deteriorated, since the bands are influenced by interference due to the technology of using radio frequency bands such as Bluetooth, or the presence of many APs, recently.

The WiGig is less influenced by interference, but there is a problem in that communication may not be available in the non-line-of-sight (NLOS) environment in which an obstacle exists between transmitting and receiving antennas. In the WiGig standard, Fast Session Transfer (FST) technology is defined to cope with the NLOS environment. In the FST technology, when the WiGig and Wi-Fi connections are both supported in the 5 GHz band or 2.4 GHz band in the same AP and the terminal, if the NLOS situation occurs while connected over WiGig and a packet is not transmitted, this may be recognized such that a connection is converted to a Wi-Fi connection.

When a video transmission environment is constructed using a wireless network, the related art Wi-Fi has a problem in that it is difficult to transmit high quality contents due to interference by other APs and Bluetooth, or the like. When the WiGig is used, it is relatively easy to transmit high quality contents because of high transmission rate, but there is a limitation that there should be no obstacle between a transmitting antenna and a receiving antenna. When using the FST technology, there is an advantage that WiGig and Wi-Fi may complement each other, but this is intended to maintain connectivity and thus has a problem that it is not suitable for video transmission. As a result, in the WiGig, there is a time delay until the NLOS situation is recognized and connection is converted to Wi-Fi and a disconnection of streaming or deterioration in image quality occurs. In addition, since WiGig and Wi-Fi operate independently of each other, there is an inefficiency in terms of quality of service (QoS) control, because WiGig converts the network packet flow to the Wi-Fi through FST in a situation where the WiGig is not aware of the Wi-Fi network situation. Further, the transmitter may not identify the video reception status of the receiver, and thus, there is a problem in that it is impossible to control the traffic, in preparation for the disconnection.

SUMMARY

Provided is a transmission system that transmits a high quality video without disconnection by integrally configuring low speed and high speed wireless networks for a video transmission system utilizing a wireless network and efficiently controlling QoS and flow.

In accordance with an aspect of the disclosure, a controlling method of an electronic device for receiving and reproducing contents includes: receiving, from an external device through a main frequency band, a signal including original data of contents and receiving, from the external device through at least one sub frequency band, a connection state signal including information on the original data; determining a reception state of the received original data based on the information included in the connection state signal; transmitting, to the external device through the main frequency band and the at least one sub frequency band, a response signal including information on the determined reception state of the original data; and receiving, from the external device and based on the response signal, at least one of a signal including first quality data of the contents and a signal including second quality data of the contents, the first quality data being a higher quality than the second quality data.

The transmitting may include: based on determining that the received original data is not missing data, transmitting, to the external device through the main frequency band and the at least one sub frequency band, a first response signal to notify that the original data is received; and based on determining that at least some of the original data is missing, transmitting, to the external device through the main frequency band and the at least one sub frequency band, a second response signal including information on a missing part of the original data.

The controlling may further include, based on the second response signal being transmitted to the external device through the main frequency band and the at least one sub frequency band more than a predetermined number of times, receiving, from the external device, the signal including the first quality data of the contents through the main frequency band, and receiving the signal including the second quality data of the contents through the at least one sub frequency band.

The controlling may further include, based on data regarding the contents not being received through the main frequency band, receiving a signal including the original data of the contents through a first sub frequency band from among the at least one sub frequency band, and receiving a connection state signal including information on the original data through a second sub band from among the at least one sub frequency bands.

The determining may include determining a buffer amount of the original data stored in a buffer; and the receiving may include, based on the determined buffer amount being less than a predetermined amount, receiving the signal including the first quality data of the contents through the first sub frequency band and receiving the signal including the second quality data of the contents through the second sub frequency band.

The determining may include determining a buffer amount of the original data stored in a buffer; and the transmitting may include transmitting, to the external device through the main frequency band and the at least one sub frequency band, a response signal including information on the determined buffer amount.

Based on the determined buffer amount being less than a predetermined amount: the transmitting may include transmitting, to the external device through the main frequency band and the at least one sub frequency band, a response signal to notify that the buffer amount is not sufficient; and the receiving may include receiving, from the external device through the main frequency band, the signal including the first quality data of the contents, and receiving, from the external device through the at least one sub frequency band, the signal including the second quality data of the contents.

In accordance with an aspect of the disclosure, an electronic device for receiving and reproducing contents includes: a communicator communicable with an external device through a plurality of frequency bands; and a processor configured to, based on a signal including original data of contents being received from the external device through a main frequency band of the communicator, and a connection state signal including information on the original data being received from the external device through at least one sub frequency band of the communicator: determine a reception state of the received original data through the main frequency band based on the information included in the connection state signal, and control the communicator to transmit, to the external device through the main frequency band and the at least one sub frequency band, a response signal including information on the determined reception state of the original data.

The processor may be further configured to: based on determining that the received original data is not missing data, control the communicator to transmit, to the external device through the main frequency band and the at least one sub frequency band, a first response signal to notify that the original data is received; and based on determining that at least some of the original data is missing, control the communicator to transmit, to the external device through the main frequency band and the at least one sub frequency band, a second response signal including information on a missing part of the original data.

Based on the second response signal being transmitted to the external device through the main frequency band and the sub frequency band more than a predetermined number of times, the signal including the first quality data of the contents may be received from the external device, through the main frequency band, and the signal including the second quality data of the contents may be received through the at least one sub frequency band.

Based on data regarding the contents not being received through the main frequency band, a signal including the original data of the contents may be received through a first sub frequency band from among the at least one sub frequency band, and a connection state signal including information on the original data may be received through a second sub band from among the at least one sub frequency band.

The electronic device may further include a buffer for storing data received from the external device, wherein the processor may be further configured to: determine a buffer amount of the original data stored in the buffer, and based on the determined buffer amount being less than a predetermined amount, receive the signal including the first quality data of the contents through the first sub frequency band, and receive the signal including the second quality data of the contents through the second sub frequency band.

The electronic device may further include a buffer for storing data received from the external device, wherein the processor may be further configured to determine a buffer amount of the original data stored in the buffer, and control the communicator to transmit, to the external device through the main frequency band and the at least one sub frequency band, a response signal including information on the determined buffer amount.

The processor may be further configured to, based on the determined buffer amount being less than a predetermined amount: control the communicator to transmit, to the external device through the main frequency band and the at least one sub frequency band, a response signal to notify that the buffer amount is not sufficient; and receive, from the external device through the main frequency band, the signal including the first quality data of the contents, and receive, from the external device through the at least one sub frequency band, the signal including the second quality data of the contents.

In accordance with an aspect of the disclosure, a controlling method of an electronic device for transmitting contents includes: transmitting, to an external device through a main frequency band, a signal including original data of contents, and transmitting, to the external device through at least one sub frequency band, a connection state signal including information on the original data; receiving, from the external device, a response signal including information on a reception state of the original data received by the external device; and transmitting, to the external device based on the response signal, at least one of a signal including first quality data of the contents and a signal including second quality data of the contents, the first quality data being a higher quality than the second quality of data.

The transmitting the at least one of the signal including the first quality data of the contents and the signal including the second quality data of the contents may include, based on the response signal received from the external device being a response signal to notify that a buffer amount of original data stored in a buffer of the external device is not sufficient, transmitting, to the external device through the main frequency band, the signal including the first quality data of the contents, and transmitting, to the external device through the at least one sub frequency band, the signal including the second quality data of the contents.

The controlling method may further include, based on the response signal received from the external device being received through only the at least one sub frequency band, transmitting, to the external device through the at least one sub frequency band, a signal including the original data.

In accordance with an aspect of the disclosure, an electronic device for transmitting contents includes: a communicator communicable with an external device through a plurality of frequency bands; and a processor configured to: control the communicator to transmit, to the external device through a main frequency band, a signal including original data of contents, and transmit, to the external device through at least one sub frequency band, a connection state signal including information on the original data, and based on a response signal including information on a reception state of the original data received by the external device being received from the external device through the communicator, control the communicator to transmit, to the external device based on the response signal, at least one of a signal including first quality data and a signal including second quality data.

Based on the response signal received from the external device being a response signal for notifying that a buffer amount of the original data stored in a buffer of the external device is not sufficient, the processor may be further configured to control the communicator to transmit, to the external device through the main frequency band, the signal including the first quality data of the contents, and transmit, to the external device through the at least one sub frequency band, the signal including the second quality data of the contents.

The processor may be further configured to, based on the response signal received from the external device being received through only the at least one sub frequency band, control the communicator to transmit, to the external device through the at least one sub frequency band, a signal including the original data.

In accordance with an aspect of the disclosure, a controlling method of an electronic device for receiving and reproducing contents includes: receiving, from an external device through a main frequency band, a signal including contents data; determining a reception state of the received contents data; transmitting, to the external device through the main frequency band and at least one sub frequency band, a response signal including information on the determined reception state of the received contents data; and receiving, from the external device and based on the response signal, at least one of a signal including the contents encoded with a first quality and a signal including the contents encoded with a second quality, the first quality being a higher quality than the second quality.

The determining the reception state of the received contents data may include determining whether an amount of the received contents data stored in a buffer is greater than a predetermined value.

The controlling method may further include: receiving, from the external device through the at least one sub frequency band, a connection state signal including information on the contents data, wherein the determining the reception state of the received contents data may include determining the reception state of the received contents data based on the information included in the connection state signal.

In accordance with an aspect of the disclosure, a non-transitory computer-readable recording medium has recorded thereon a program executable by a computer for performing the controlling method.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Figure 1:
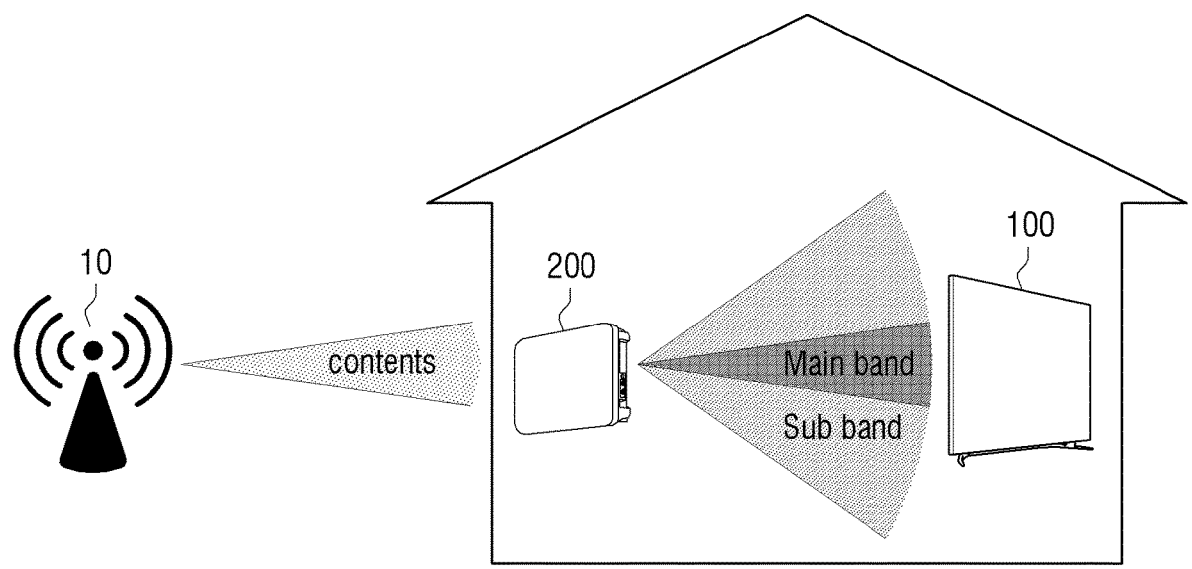
FIG. 1 is a view to describe an overall wireless communication network between electronic devices.

Hereinafter, embodiments of the disclosure will be described with reference to the accompanying drawings. However, it may be understood that the disclosure is not limited to embodiments described hereinafter, but includes various modifications, equivalents, and/or alternatives of these embodiments. In relation to explanation of the drawings, similar drawing reference numerals may be used for similar constituent elements.

In the description, the terms "first," "second," and so forth are used to describe diverse elements regardless of their order and/or importance and to discriminate one element from other elements, but are not limited to the corresponding elements. For example, a first user appliance and a second user appliance may indicate different user appliances regardless of their order or importance. For example, without departing from the scope as described herein, a first element may be referred to as a second element, or similarly, a second element may be referred to as a first element.

It is to be understood that an element (e.g., a first element) that is "operatively or communicatively coupled with/to" another element (e.g., a second element) may be directly connected to the other element or may be connected through another element (e.g., a third element). On the other hand, when it is stated that an element (e.g., a first element) is "directly connected" or "directly accessed" to another element (e.g., a second element), it is understood that there is no other element (e.g., a third element) between the elements.

The terms used in the description are used to describe an embodiment, but may not intend to limit the scope of other embodiments. Unless otherwise defined specifically, a singular expression may encompass a plural expression. All terms (including technical and scientific terms) used in the description could be used as meanings commonly understood by those ordinary skilled in the art to which the disclosure belongs. The terms that are used in the disclosure and are defined in a general dictionary may be used as meanings that are identical or similar to the meanings of the terms from the context of the related art, and they are not interpreted ideally or excessively unless they have been clearly and specially defined. According to circumstances, even the terms defined in embodiments of the disclosure may not be interpreted as excluding embodiments of the disclosure.

Hereinbelow, various embodiments will be further described with reference to the attached drawings.

FIG. 1 is a view to describe an overall wireless communication network between electronic devices 100 and 200.

Referring to FIG. 1, a transmitting electronic device 200 may receive video contents from an external base station 10. The transmitting electronic device 200 may transmit the video contents to a receiving electronic device 100 for reproducing the video contents through wireless communication. In the drawing, the transmitting electronic device 200 is illustrated as a general set-top box, but it is understood that one or more other embodiments are not limited thereto, and the electronic device 200 may be any type of electronic device that is capable of storing contents to be transmitted, such as a smartphone, the AP, a television (TV), or the like. In addition, the receiving electronic device 100 is illustrated as a TV, but it is understood that one or more other embodiments are not limited thereto, and may be any type of electronic devices including or connectable to a display, such as a smartphone, a TV, a personal computer (PC), a mobile device, or the like.

The wireless communication herein may mean communication using a main frequency band and a sub frequency band simultaneously. At this time, the main frequency band has the same meaning as a main band, and the sub frequency band has the same meaning as a sub band.

The main band may be a network having strong straightness by using mmWave in, for example, 60 GHz band such as the WiGig. The 60 GHz band has a relatively small number of technologies that are used in common and thus is less influenced by interference, and by using a wide bandwidth, may achieve a high data transmission rate (about 4.3 Gbps).

In the meantime, in the case of the WiGig, the LOS environment in which the AP and the antenna of the electronic device face each other without an obstacle should be satisfied. That is, if there is an obstacle between the receiving electronic device 100 and the transmitting electronic device 200 (NLOS), there is a disadvantage in that there may be a difficulty in receiving, from the transmitting electronic device 200, the data having strong straightness by the receiving electronic device 100.

The sub band may be a network that uses, for example, 4 GHz frequency band (802.11n) and 5 GHz frequency band (802.11ac), such as Wi-Fi. The Wi-Fi may provide a relatively high bandwidth using multiple antennas, but 2.4 GHz and 5 GHz bands are bands that may be freely used without a permission, license, or other form of authorization. Therefore, when the main band is in the NLOS environment, the transmitting electronic device 200 may transmit the data to the receiving electronic device 100 through a sub band of which diffraction is relatively easy.

In the description above, it has been described that a high speed network WiGig is used as an example of the main band, and a low speed network Wi-Fi is used as an example of the sub band, but this is merely exemplary and it is understood that one or more other embodiments are not limited thereto. For example, the main band and the sub band of the disclosure may be applicable to all the cases where two or more wireless network environments including Wi-Fi, WiGig, long-term evolution (LTE), 5G communication, or the like, are present in a mixed manner.

According to an embodiment, the transmitting electronic device 200 may transmit, to the receiving electronic device 100, data for the contents received at the external base station 10 through the main band and sub band. The receiving electronic device 100 may determine a data reception state such as whether the data for the received contents is normally received, whether a part of the data is missing, and a state of a buffer indicating whether the received data is stored in the buffer of the electronic device 100, or the like. The receiving electronic device 100 may transmit, to the transmitting electronic device 200, a response signal including information on the reception state of the data using both the main band and the sub band. At this time, the response signal including information on the reception state may be information on at least one of whether to receive the original data (e.g., data that is not transcoded for transmission to high quality and/or low quality data), whether data is missing, and a remaining buffer amount of the data, and may include various information without being limited thereto.

When the transmitting electronic device 200 receives a response signal through the wireless network, the transmitting electronic device 200 may determine data to be transmitted to the receiving electronic device 100 and the wireless network based on the received response signal.

For example, when a response signal about missing data is received from the receiving electronic device 100, the transmitting electronic device 200 may transmit the missing data through the main band and the sub band.

As a still another example, when a response signal indicating that a buffer amount of data is insufficient is received from the receiving electronic device 100, it may be determined that a communication state of the main band is not good or suitable, and transcoded data, instead of original data, of the contents may be transmitted through the main band and the sub band.

As a still another example, if the transmitting electronic device 200 receives the response signal only through the sub band and does not receive the response signal through the main band, it may be determined that the main band is in a disconnected state. The state where the main band is disconnected may include, without limitation, that the network of the main band is in the NLOS state as described above. In this case, the transmitting electronic device 200 may transmit data for the contents to the receiving electronic device 100 through the sub band to prevent disconnection of the data transmission.

As described above, the transmitting electronic device 200 according to an embodiment may recognize that the communication state of the main band is not good prior to the NLOS state, predict disconnection of the main band, and transmit data through the sub band, in advance. As a result, a user may view a video without disconnection, unlike communication through the related art fast session transfer (FST) technology.

Figure 2A:
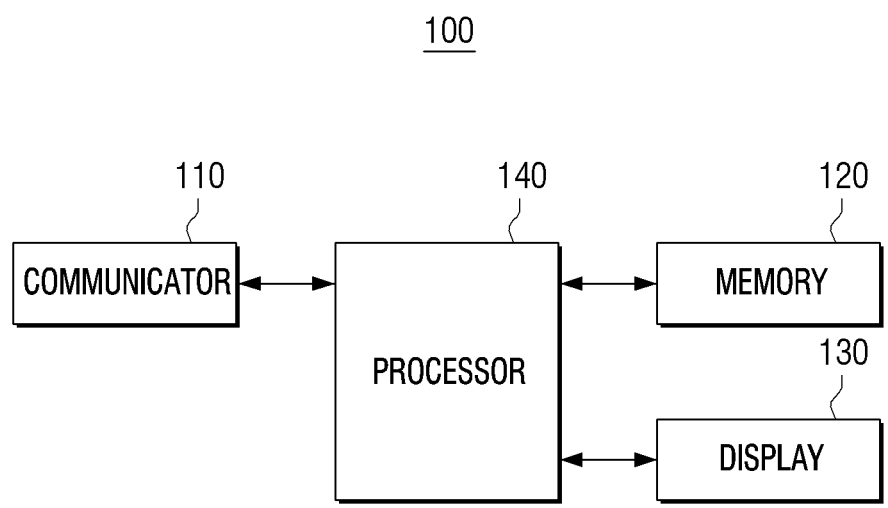
FIG. 2A is a block diagram to describe a configuration of a receiving electronic device according to an embodiment.
Figure 2B:
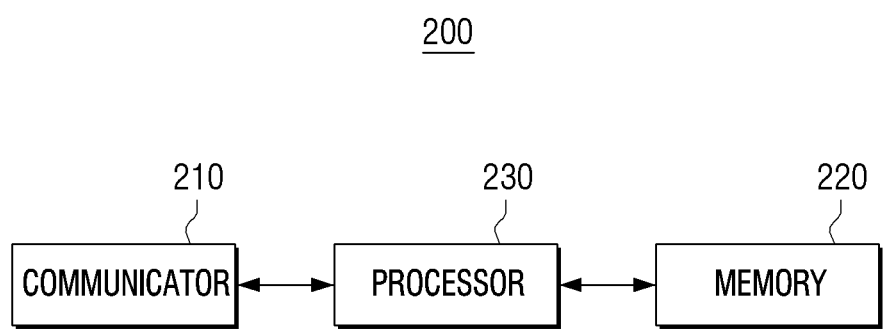
FIG. 2B is a block diagram to describe a configuration of a transmitting electronic device according to an embodiment.

FIGS. 2A and 2B are block diagrams to describe a configuration of a transmitting electronic device 200 and a receiving electronic device 100 according to an embodiment.

FIG. 2A is a block diagram to describe a configuration of the receiving electronic device 100 according to an embodiment. Referring to FIG. 2A, the receiving electronic device 100 may include a communicator 110, a memory 120, a display 130, and a processor 140.

The communicator 110 is a configuration for communicating with at least one of the transmitting electronic device 200, the external base station 10, an external device, and an external server. In particular, the communicator 110 may receive data related to contents from the transmitting electronic device 200.

The communicator 110 may receive, from the transmitting electronic device 200, a signal including the data on the contents through a plurality of frequency bands. In particular, the communicator 110 may receive original data of the contents through the main band, and receive a connection status signal (CSS) including information on the original data through the sub band. At this time, the CSS may include information on a time stamp regarding the original data to be transmitted.

It is understood, however, that this is merely exemplary, and the communicator 110 may receive the original data from the transmitting electronic device 200 through the sub band, and receive high quality data (e.g., first quality data) and low quality data (e.g., second quality data having a lower quality than the first quality data) that are obtained by transcoding the original data from the transmitting electronic device 200 through the main band and the sub band.

The communicator 110 may transmit, to the transmitting electronic device 200, a response signal (e.g., Acknowledgment (ACK) signal) for data reception, a response signal (e.g., Drop signal) for missing data, a response signal (e.g., Buffer state signal (BSS)) about the data buffer amount, or the like. Here, the ACK signal may be a signal for notifying that the receiving electronic device 100 has received data from the transmitting electronic device 200 without missing data. The drop signal may be a signal including information on missing data in a communication process. The BSS signal may be a signal indicating that the data buffer amount stored in the buffer in the receiving electronic device 100 is less than a predetermined amount.

The memory 120 may store data on the contents received from the transmitting electronic device 200. In particular, the memory 120 may include a buffer for temporarily storing the received contents. Here, the buffer refers to a memory area that is used for the purpose of compensating for the difference in data transmission speed or data processing speed between two devices when data is transferred from one device to another device and favorably combining the data. The buffer may transmit and receive data between the central processing unit (CPU) and the terminal or another input and output device as an input and output area. In addition, the buffer may process data at a high speed through a small-capacity buffer memory (also referred to as a local memory) that operates at high speed between the central processing unit and the main memory device.

The display 130 is configured to reproduce a streaming video of the contents according to a control command and provide various user interfaces (UIs) to a user. The display 130, when it is determined that the buffer amount in the buffer of the electronic device is not enough or otherwise insufficient, may display a UI for notifying that the buffer amount is not sufficient. While the display is receiving the original data, if high quality and/or low quality data that is obtained by transcoding of the original data of the contents is received, the display 130 may display a UI for notifying that the received data is changed. Similarly, when receiving the original data while receiving the transcoded data, the display 130 may display a UI notifying that the received data is changed.

In the meantime, the display 130 may have various sizes. For example, the display 130 may have sizes such as 3 inches, 4 inches, 4.65 inches, 5 inches, 6.5 inches, 8.4 inches, 32 inches, 45 inches, or the like. The display 130 may be configured with a plurality of pixels. At this time, the width× height of the plurality of pixels may be expressed as a resolution.

The display 130 may be implemented as various types of display panels. For example, the display panel may implemented with a liquid crystal display (LCD), organic light emitting diodes (OLED), active-matrix organic light-emitting diode (AMOLED), liquid crystal on silicon (LcoS), digital light processing (DLP), or the like. The display 130 may be coupled to at least one of a front area, a side area, and a back area of the electronic device 100 as a format of a flexible display.

The display 130 may be coupled with a touch sensor and implemented as a touch screen of a layer structure. The touch screen may have not only a display function but also a function to detect a touch input pressure as well as a touch input position, and a touched area. In addition, the display 130 may have a function to detect a proximity touch as well as real touch. Further, the display 130 may include a fingerprint sensing area.

The processor 140 is a configuration for controlling the electronic device 100, such as overall control of the electronic device 100. The processor 140 may control the communicator to receive, from an external device (e.g., the transmitting electronic device 200), a signal including the original data of the contents through a main frequency band, and receive, from the external device, a connection state signal including the information on the original data through at least one sub-frequency band.

The processor 140 may determine whether the received original data is missing or not through the main frequency band based on information included in the connection state signal, and determine a buffer amount indicating that the original data is stored in the buffer. The processor 140 may control the communicator to transmit, to an external device, a response signal including information on at least one of missing original data and the buffer amount through the main frequency band and at least one sub-frequency band. A specific operation of the processor 140 will be described in greater detail below.

FIG. 2B is a block diagram to describe a configuration of a transmitting electronic device 200 according to an embodiment.

Referring to FIG. 2B, the transmitting electronic device 200 may include a communicator 210, a memory 220, and a processor 230.

The communicator 210 is a configuration for communicating with at least one of a receiving electronic device 200, an external base station 10, an external device and an external server. In particular, the communicator 210 may receive, from the receiving electronic device 100, a signal including a user command to transmit specific contents, and receive, from the external base station 10, a signal including data of the specific contents.

The communicator 210 may transmit a signal including data on the contents received from the external base station 10 through a plurality of frequency bands. In particular, the communicator 210 may transmit the original data for the contents through the main band, and transmit the connection state signal (CSS) including the information on the original data through the sub band. It is understood, however, that this is merely exemplary, and the communicator 210 may transmit, to the receiving electronic device 100, the original data 100 through the sub band, and transmit, to the receiving electronic device 100, the high quality data and the low quality data that are obtained by transcoding the original data through the main band and the sub band.

The communicator 210 may receive, from the receiving electronic device 100, various information such as a response signal (e.g., ACK signal) for data reception, a response signal (e.g., Drop signal) for missing data, a response signal (e.g., BSS signal) for the data buffer amount, or the like. At this time, the ACK signal may be a signal for notifying that the receiving electronic device 100 has received data from the transmitting electronic device 200 without missing data. The drop signal may be a signal including information on missing data in a communication process. The BSS signal may be a signal to notify that the amount of buffer of the data stored in the buffer in the receiving electronic device 100 is less than a predetermined amount.

The memory 220 may store data on the contents received from the external base station 10. In particular, the memory 220 may include a buffer for temporarily storing the received and/or transmitted contents. The memory 220 may also store information on the response signal received from the receiving electronic device 100 and store information on the pre-transmitted data in order to determine data to be transmitted to the receiving electronic device 100 in response to the response signal. Specifically, the memory 220 may store metadata information of data transmitted to the receiving electronic device 100, information on the time of transmitting the data, information on the number of transmitted data frames, or the like.

The processor 230 may control the communicator to transmit, to an external device, a signal including the original data of the contents through the main frequency band, and transmit, to the external device, a connection state signal including information on the original data through at least one sub frequency band.

The processor 230 may control the communicator to receive a response signal including information on at least one of whether the original data received by the external device is missing or the buffer amount indicating the original data stored in the buffer in the external device. The processor 230 may determine the data to be transmitted based on the response signal, and control the communicator 210 to transmit the signal including the data according to the determination result to the external device through the main frequency band and the at least one sub frequency band. The specific operation of the processor 230 will be described in detail below.

The communicators 110 or 210 may be configurations to communicate with various types of external devices according to various types of communication methods. The communicator 110 or 210 may include at least one of a WiGig chip, a Wi-Fi chip, a Bluetooth chip, a wireless communication chip, a near field communication (NFC) chip, etc.

In particular, each of the WiGig chip, the Wi-Fi chip, and the Bluetooth chip may perform communication by the WiGig method, the Wi-Fi method, and the Bluetooth method, respectively. When the WiGig chip, the Wi-Fi chip, and the Bluetooth chip are used, various connection information such as a service set identifier (SSID) and a session key may be transmitted and received first, and communication information may be used to transmit and receive various information. The wireless communication chip means a chip that performs communication according to various communication standards such as IEEE, Zigbee, Z wave, 3rd generation (3G), 3rd generation partnership project (3GPP), long term evolution (LTE), or the like. The NFC chip refers to a chip operating in an NFC mode using 13.56 MHz band among various radio frequency identification (RFID) frequency bands such as 135 kHz, 13.56 MHz, 433 MHz, 860 to 960 MHz, 2.45 GHz, or the like.

The communicator 110 or 210 may include a plurality of antennas to communicate through a plurality of frequency bands. The antenna may be a multi-band antenna capable of receiving a plurality of frequency band signals. The multi-band antennas may be antennas in which the length of an element is designed so that the frequencies that are in a multiple relation to each other are transmitted and received by a single antenna. For example, when 5 MHz and 7 MHz are transmitted, an antenna of half wave may be used at 3.5 MHz and an antenna of one wavelength may be used at 7 MHz.

The memory 120 or 220 may store various data for operation of the overall electronic device 100 or 200 such as a program for processing or controlling the processor 140 or 230. The memory 120 or 220 may store a plurality of application programs (application programs or applications) that are driven or executed on the electronic device 100 or 200, data for operation of the electronic device 100 or 200, instructions, etc. At least one of these applications may be downloaded from an external server through wireless communication. In addition, at least one of these applications may exist on the electronic device from the time of release for the basic function of the electronic device 100 or 200. The application program may be stored in the memory 120 or 220, and may be driven by the processor 140 or 230 to perform the operation (or function) of the electronic device 100 or 200.

The memory 120 or 220 may be implemented as anonvolatile memory, volatile memory, flash memory, a hard disk drive, a solid state drive (SSD), or the like. The memory 120 or 220 may be accessed by the processor 140 or 230, and reading/recording/modifying/deleting of data may be performed by the processor 140 or 230. In this disclosure, the term memory may include the memory 120 or 220, read-only memory ROM, random access memory RAM in the processor 140 or 230, or a memory card mounted in a display device (for example, a micro secure digital (SD) card, memory stick).

The processor 140, 230 may include a central processing unit (CPU), a random access memory (RAM), read-only memory (ROM), and a system bus. Here, the ROM is a configuration in which a command set is stored for system booting, the CPU copies an operating system (O/S) stored in the memory of the electronic device 100 or 200 to the RAM according to the instructions stored in the ROM, and executes the O/S to boot the system. When the booting is completed, the CPU copies and executes various applications stored in the memory 120 or 220 to the RAM to perform various operations. It has been described that the processor 140 or 230 includes only one CPU, but in implementation, there may be a plurality of CPUs or processors (e.g., digital signal processor (DSP), system on chip (SoC), etc.).

According to an embodiment, the processor 140 or 230 may be implemented as a digital signal processor (DSP), a microprocessor, and a time controller (TCON), but is not limited thereto. The processor 140 or 230 may include one or more among a central processing unit (CPU), a micro controller unit (MCU), a micro processing unit (MPU), a controller, an application processor (AP), a communication processor (CP), and an Advanced Reduced instruction set computing (RISC) Machine (ARM) processor or may be defined as a corresponding term. The processor 140 or 230 may be implemented in a system on chip (SoC) type or a large scale integration (LSI) type in which a processing algorithm is built therein or in a field programmable gate array (FPGA) type.

Figure 3:
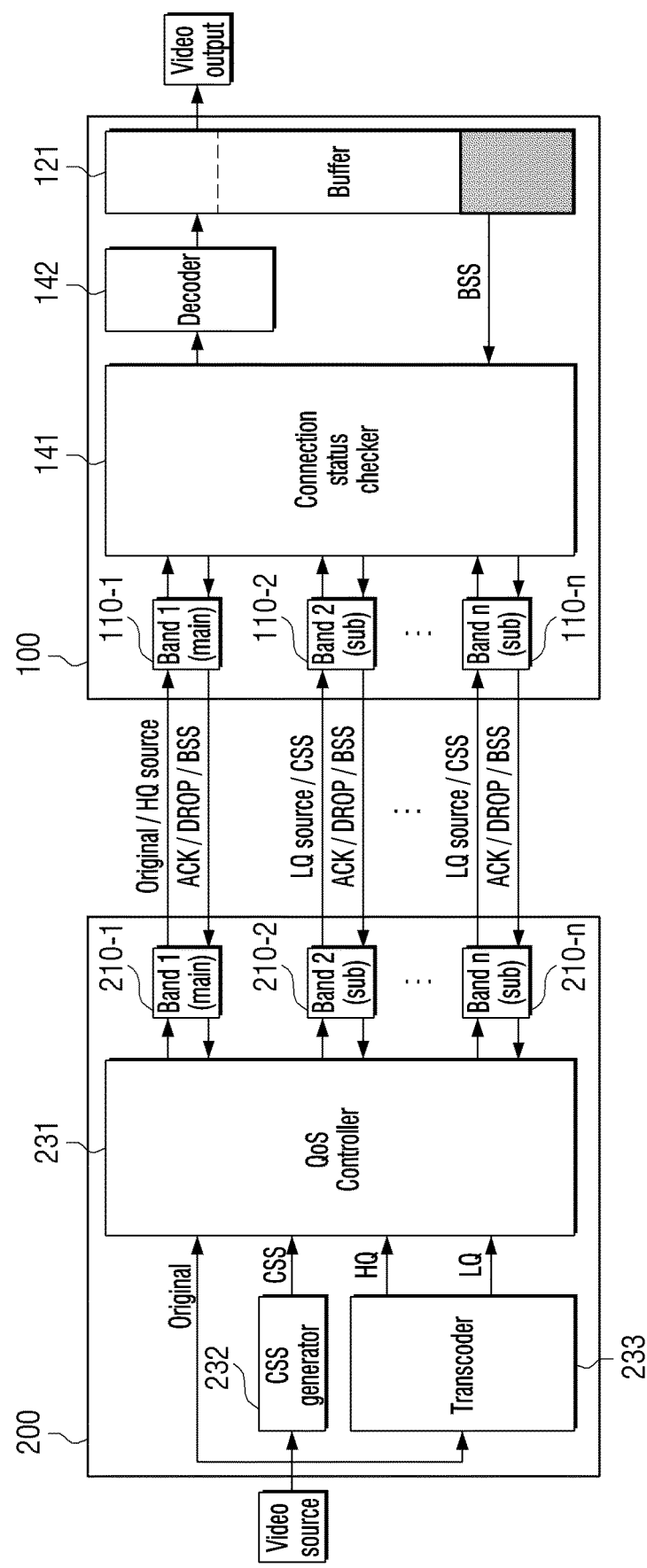
FIG. 3 is a view illustrating a block diagram to describe a configuration of wireless network communication between a transmitting electronic device and a receiving electronic device according to an embodiment.

FIG. 3 is a block diagram to describe a configuration of wireless network communication between a transmitting electronic device 200 and a receiving electronic device 100 according to an embodiment.

The transmitting electronic device 200 may include a QOS controller 231, a CSS generator 232, and a transcoder 233. The QOS controller 231, the CSS generator 232, and the transcoder 233 may be configurations that are included in the processor 230 or configurations that are configured separately from the processor 230 and operate according to the instructions of the processor 230.

The CSS generator 232 may generate a CSS for sensing a communication state with the receiving electronic device 100. The CSS may include information on the data that is transmitted to the receiving electronic device 100. For example, the CSS may include information on the time stamp for data to be transmitted. The receiving electronic device 100 may determine whether a frame is transferred without disconnection by checking information on the original data received and the time stamp included in the CSS.

The transcoder 233 may process, sort, and convert multimedia contents, such as voice, data, and video, aimed at a single environment, to be used in the environment of the receiving electronic device 100. For example, the transcoder 233 may convert a high definition television (HDTV) contents signal, which is MPEG 2 encoded at a bit rate of 20 Mbps, to be received by the receiving electronic device 100 implemented as a person digital assistant (PDA) or a smartphone. The transcoder 233 may use a general-purpose framework standardized in, by way of example, MPEG-21 for defining, distributing and consuming digital multimedia contents.

Specifically, the transcoder 233 may convert the data of the contents to high quality or low quality data so that the data for the contents may be transmitted through a plurality of bands. At this time, the low quality data may be reproduced at low quality by using scalable encoding, even with low quality data alone, but the high quality data may not be reproduced by itself without low quality data.

The QOS controller 231 is a configuration to sort data to be transmitted from each band and control traffic, by managing and monitoring the network connection. In addition, the QOS controller 231 may maintain the buffer of the memory 220 to retransmit the data frame that is missing in the process of transmitting data of the contents.

Referring to FIG. 3, the receiving electronic device 100 may include a buffer 121, a connection state checker 141, and a decoder 142. At this time, the buffer 121 may be a configuration included in the memory 120, or a configuration separate from the memory 120. The connection state checker 141 and the decoder 142 may be configurations included in the processor 140 or configurations separate from the processor 140 to be controlled by the processor 140.

The connection state checker 141 may recognize the network state by combining signals including the data received from the transmitting electronic device 200, determine missing data through comparison of signals, and/or control a response signal including information on the buffer amount received from the buffer 121.

The decoder 142 may decode data so that the contents included in the data received from the transmitting electronic device 200 are reproduced by the receiving electronic device 100.

The buffer 121 may temporarily store the data on the received contents from the transmitting electronic device 200, and retrieve the stored data to reproduce the data in the display 130. In addition, when the stored buffer amount of the data is less than a predetermined amount, the buffer 121 may generate the BSS to provide a warning or notification to the transmitting electronic device 200.

In the meantime, the communicator 210 of the transmitting electronic device 200 may communicate with a plurality of antennas 110-1, 110-2 to 110-$n$ of the receiving electronic device 100 through a plurality of antennas 210-1, 210-2 to 210-$n$ to use a plurality of frequency bands (or a plurality of bands). At this time, the plurality of antennas 210-1, 210-2 to 210-$n$ and the plurality of antennas 110-1, 110-2 to 110-$n$ may be a configuration to use a multi-band in each communicator 110 or 210 or configured as a module separate from the communicator 110 or 210.

Referring to FIG. 3, the transmitting electronic device 200 may transmit original data as high quality data (e.g., HQ source) to the receiving electronic device 100 through the main band in accordance with one or more embodiments and receive the ACK signal, the DROP signal, and the BSS signal through the main band. The transmitting electronic device 200 may also transmit low quality data (e.g., LQ source) and the CSS signal to the receiving electronic device 100 through the sub band according to one or more embodiments and may receive the ACK signal, the DROP signal, and the BSS signal through the main band. It is understood, however, that one or more other embodiments are not limited thereto, and the electronic devices 100 and 200 may transmit and receive various signals through the main band and the sub band.

The process of transmitting and receiving various signals by the electronic devices 100 and 200 through the main band and the sub band will be further described below.

Figure 4A:
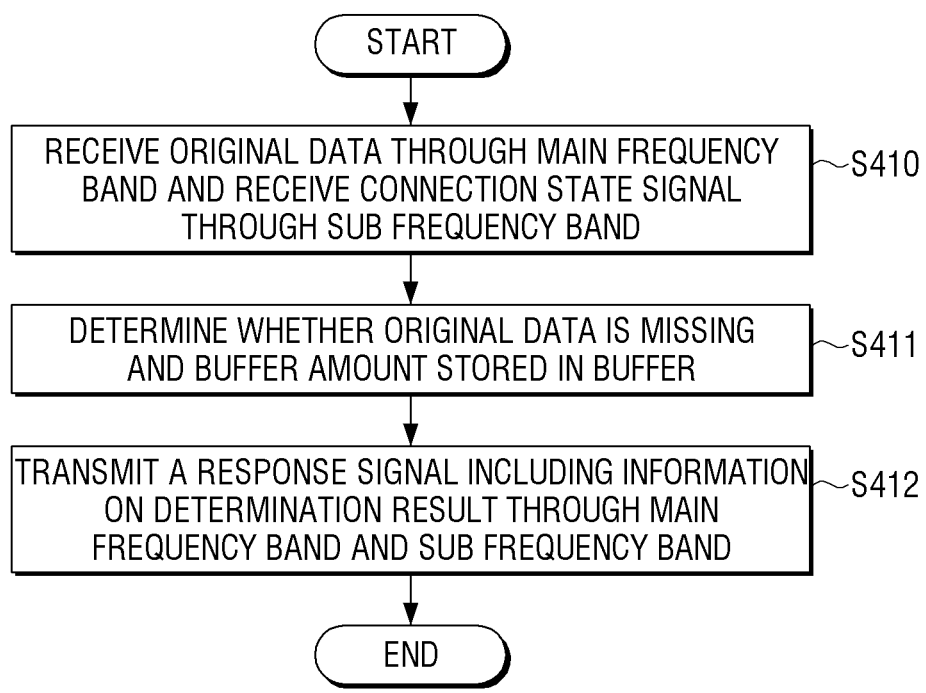
FIG. 4A is a block diagram to describe a method for transmitting and receiving data between electronic devices according to an embodiment.
Figure 4B:
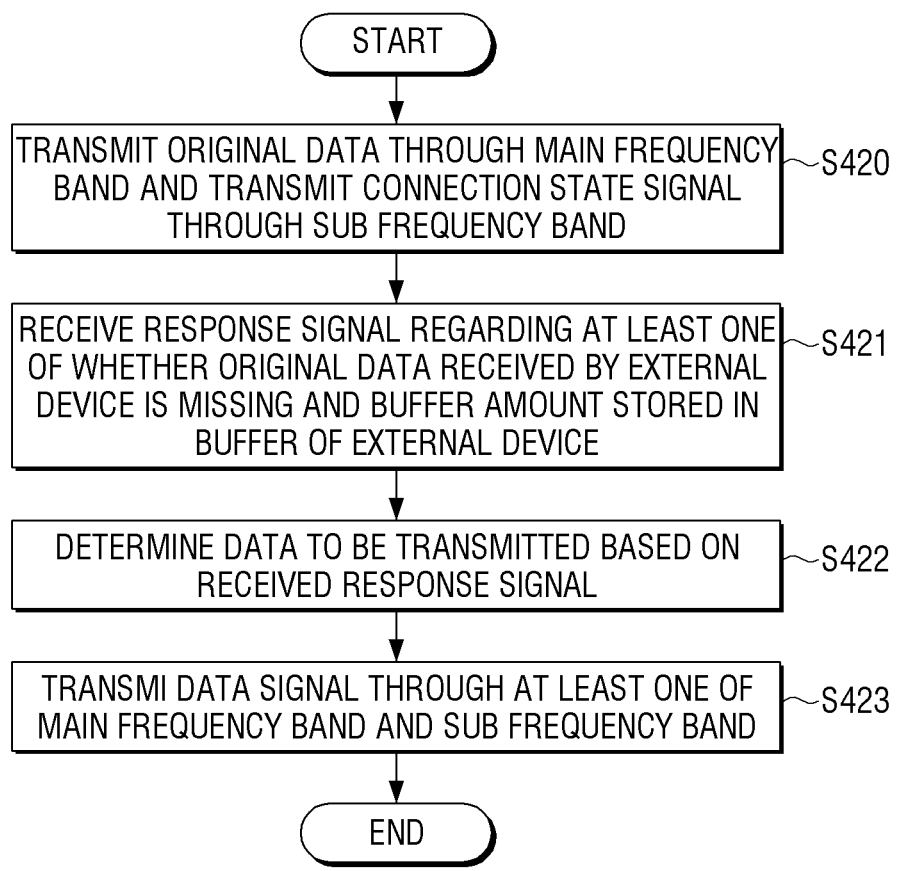
FIG. 4B is a block diagram to describe a method for transmitting and receiving data between electronic devices according to an embodiment.

FIGS. 4A and 4B are block diagrams to describe a method for transmitting and receiving data between the electronic devices 100 and 200 according to an embodiment.

FIG. 4A is a view to describe a process of transmitting and receiving data by the receiving electronic device 100 with the transmitting electronic device 200.

Referring to FIG. 4A, the receiving electronic device 100 may receive original data of the contents from the transmitting electronic device 200 through a main band (or a main frequency band) and receive the CSS through a sub band (or a sub frequency band) in operation S410. Thereafter, the receiving electronic device 100 may determine whether the original data is missing based on the received original data and the CSS, and determine the buffer amount of the data stored in the buffer 121 in the receiving electronic device 100 in operation S411. The receiving electronic device 100 may transmit the ACK signal to the transmitting electronic device 200 using both the main band and the sub band when the original data is normally received. In addition, if it is determined that the original data is missing, the receiving electronic device 100 may transmit the drop signal to the transmitting electronic device 200. Further, if it is determined that the buffer amount of the data stored in the buffer is less than the predetermined amount, the receiving electronic device 100 may transmit the buffer status signal (BSS) to the transmitting electronic device 200 in operation S412.

FIG. 4B is a view to describe a process of transmitting and receiving data by the transmitting electronic device 200 with the receiving electronic device 100.

Referring to FIG. 4B, the transmitting electronic device 200 may transmit original data of the contents to the receiving electronic device 100 through the main band, and may transmit the CSS through the sub band in operation S420. The transmitting electronic device 200 may receive, from the receiving electronic device 100, a drop signal including information on whether the original data transmitted to the receiving electronic device 100 or the external device is missing, the BSS signal including information on the buffer amount stored in the buffer of the receiving electronic device 100 or the external device, and the ACK signal including information that the receiving electronic device 100 has normally received data, through the main band and sub band in operation S421. The transmitting electronic device 200 may determine data to be additionally transmitted and the frequency band based on the drop signal, the BSS signal, and the ACK signal received from the receiving electronic device 100 in operation S422. The transmitting electronic device 200 may transmit information on the contents to the receiving electronic device 100 through at least one of the main band and the sub band based on the determined result in operation S423.

As described above, since the transmitting electronic device 200 and the receiving electronic device 100 transmit and receive various signals related to original data transmission through the main band, the communication state of the main band is predicted and the sub band is appropriately used when necessary, and data transmission without disconnection may be provided.

FIGS. 5A, 5B, 5C, 5D, and 5E are views to describe a process related to the data that is performed by the receiving electronic device 100 when a communication through a main frequency band is smooth, according to an embodiment.

Figure 5A:
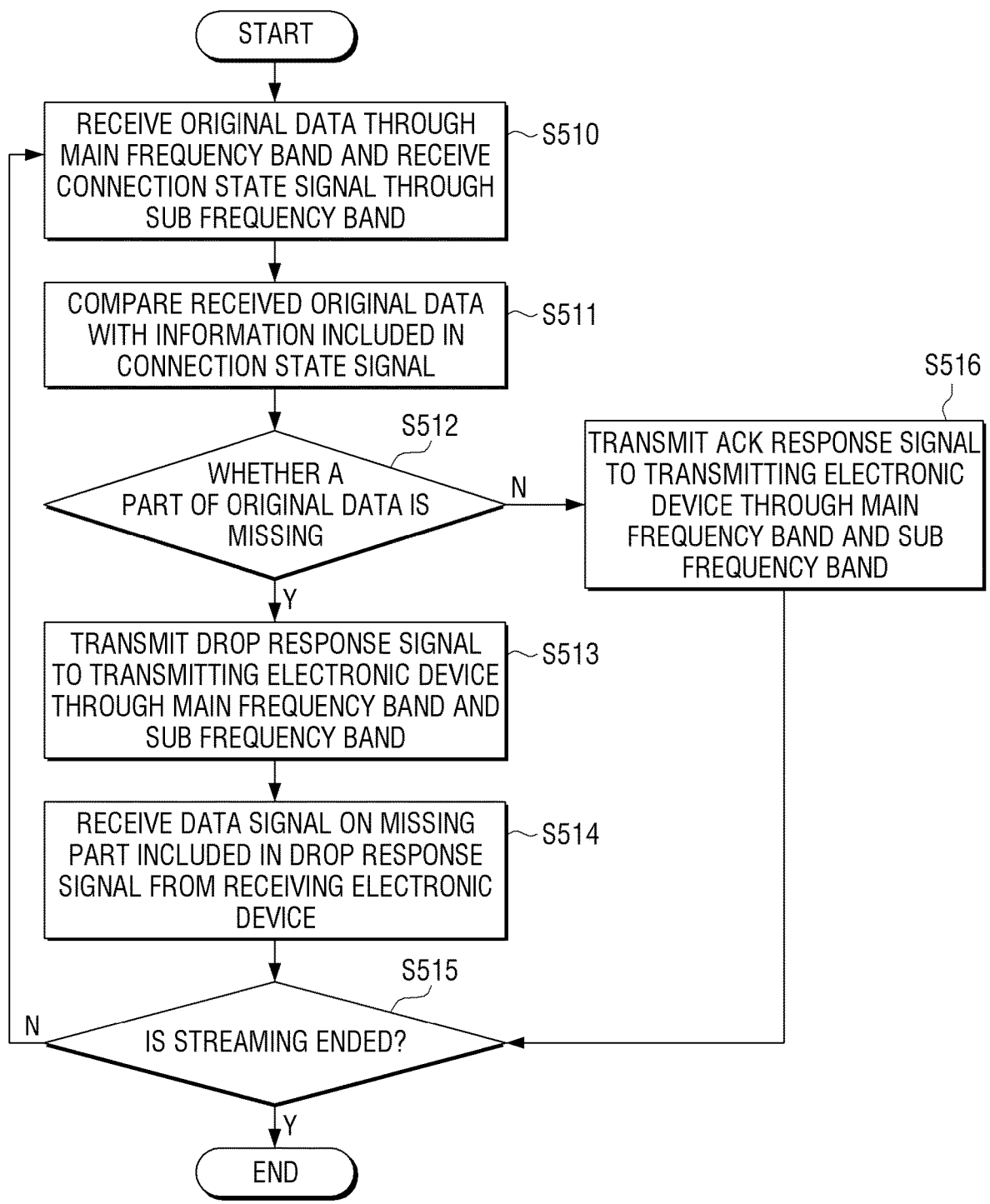
FIGS. 5A, 5B, 5C, 5D, and 5E are views to describe a process related to the data that is performed by the receiving electronic device when a communication through a main frequency band is smooth, according to an embodiment.

FIG. 5A is a flowchart to describe a method for determining whether a part of data is missing by the receiving electronic device 100 according to an embodiment.

When receiving or downloading contents, the receiving electronic device 100 may receive data on the contents from the outside. In particular, the receiving electronic device 100 may receive the original data for the contents from the transmitting electronic device 200 through the main band (or the main frequency band), and receive the CSS through the sub band (or the sub frequency band) in operation S510. The receiving electronic device 100 may combine and compare the information regarding the received original data with the original data included in the CSS in operation S511, and determine whether a part of the received original data is missing in operation S512. Specifically, the receiving electronic device 100 may check the information on the transmitted original data and the time stamp included in the CSS to determine whether the data has been transmitted without disconnection of frames.

If the receiving electronic device 100 determines that a part of the original data is missing in operation S512-Y, the receiving electronic device 100 may transmit a response signal (drop signal) for notifying that a part of the original data is missing to the transmitting electronic device 200 in operation S513. In particular, since the receiving electronic device 100 transmits the drop signal to the transmitting electronic device 200 through both the main band and the sub band, when the transmitting electronic device 200 receives the drop signal only through the sub band, it may be determined that the main band is disconnected. This will be described in detail below. In the meantime, the drop signal may include information on the missing part of the received original data.

The receiving electronic device 100 may re-receive the missing data portion included in the drop signal from the transmitting electronic device 200 in operation S514. At this time, the receiving electronic device 100 may receive the missing data portion through both the main band and the sub band. The receiving electronic device 100 may stop receiving additional data when the streaming contents reproduction or download through the display 130 is completed in operation S515-Y, and if the streaming contents reproduction or download has not ended in operation S515-N, the receiving electronic device 100 may receive data on the contents again through the frequency band with the main band in operation S510.

In the meantime, when the receiving electronic device 100 determines that the original data for the contents has been received without any missing data in operation S512-N, the receiving electronic device 100 may transmit, to the transmitting electronic device 200, a response signal (ACK signal) for notifying that the receiving of the contents data has been normally performed. At this time, the receiving electronic device 100 may transmit the ACK signal using both the main band and the sub band in operation S516. When the transmitting electronic device 200 receives the ACK signal only through the sub band, it may be determine that the main band is disconnected. This will be described in detail below. When the transmitting electronic device 200 receives the ACK signal through the main band and the sub band, it may be determined that the wireless network connection of the main band is smooth. Accordingly, if the streaming contents reproduction in the receiving electronic device 100 is not terminated or the contents downloading is not terminated in operation S515-N, the receiving electronic device 100 may receive the contents data through the main band and the sub band as before in operation S510.

Figure 5B:
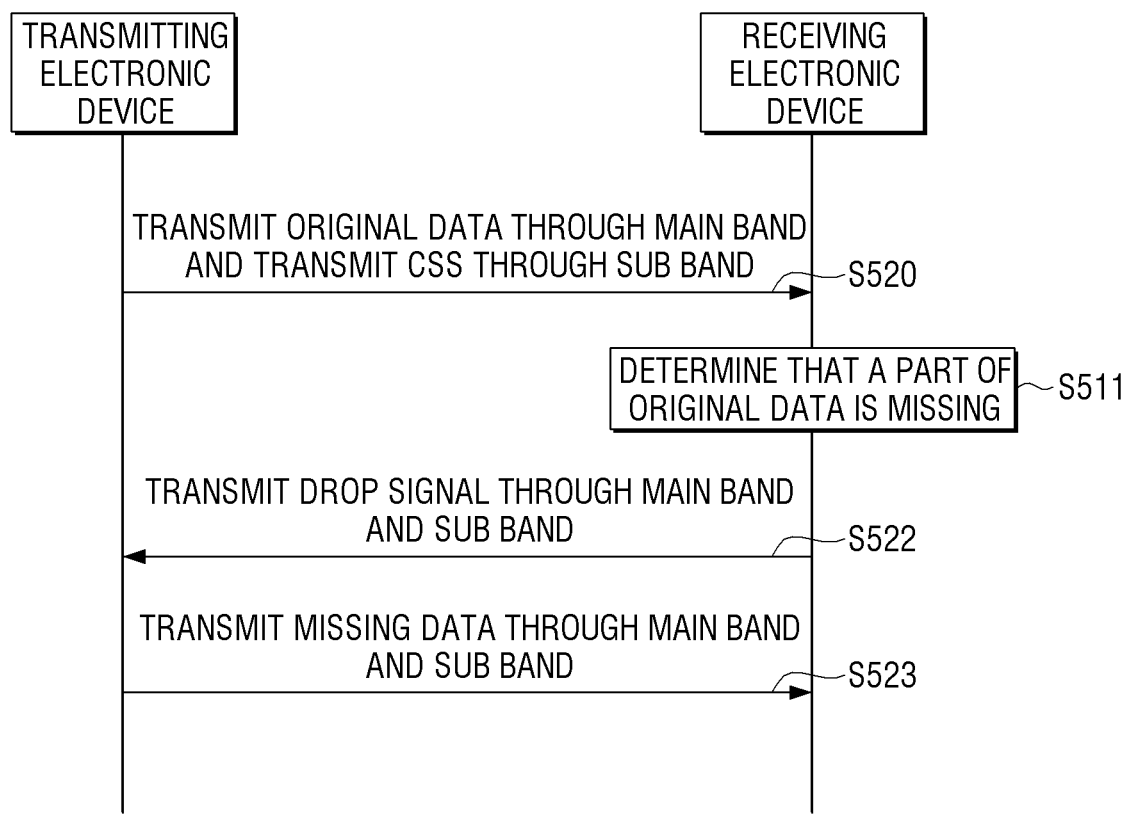

FIG. 5B is a sequence map to describe a process between the receiving electronic device 100 and the transmitting electronic device 200, when a part of the data received by the receiving electronic device 100 is missing.

Referring to FIG. 5B, the transmitting electronic device 200 may transmit original data for the contents through the main band to the receiving electronic device 100, and transmit the CSS including the information on the original data through the sub band in operation S520. The receiving electronic device 100 may combine and compare the received original data and CSS to determine whether a part of the original data is missing in operation S521. If it is determined that a part of the original data is missing, the receiving electronic device 100 may transmit the drop signal using both the main band and the sub band to the transmitting electronic device 200 in operation S522. When receiving the drop signal, the transmitting electronic device 200 may determine that the data transmission through the main band is temporarily not smooth. That is, for a drop signal that is not repetitive, the transmitting electronic device 200 may determine that the communication failure of the main band is merely temporary and that the missing part of data based on the information about the missing data included in the received drop signal may be transmitted to the receiving electronic device 100 through the main band and the sub band as in the related art data transmission method in operation S523.

In the meantime, when receiving the repeated drop signals, the transmitting electronic device 200 may determine that the communication state of the main band is not continuously smooth. In this case, the transmitting electronic device 200 may determine that the communication transmission rate through the main band is deteriorated. In order to prevent disconnection of reproducing of the contents, the transmitting electronic device 200 may transmit low quality data for the contents to the receiving electronic device 100 through the sub band. In addition, the transmitting electronic device 200 may also transmit high quality data, which enables high quality images to be reproduced based on low quality data, through the main band. The receiving electronic device 100 may maintain the reproduction of the contents with only the low quality data transmitted through the sub band, and if the high quality data is normally received through the main band, the receiving electronic device 100 may reproduce the high quality contents.

Figure 5C:
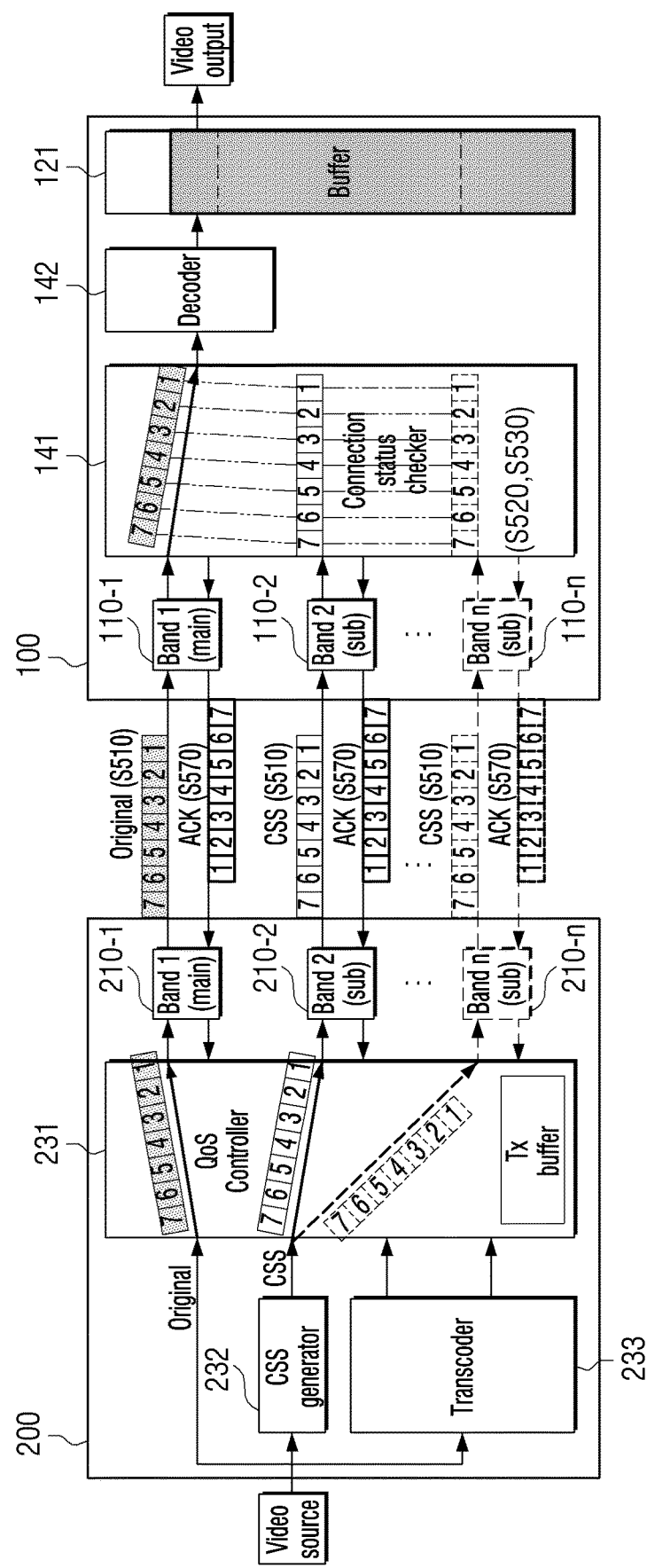
Figure 5D:
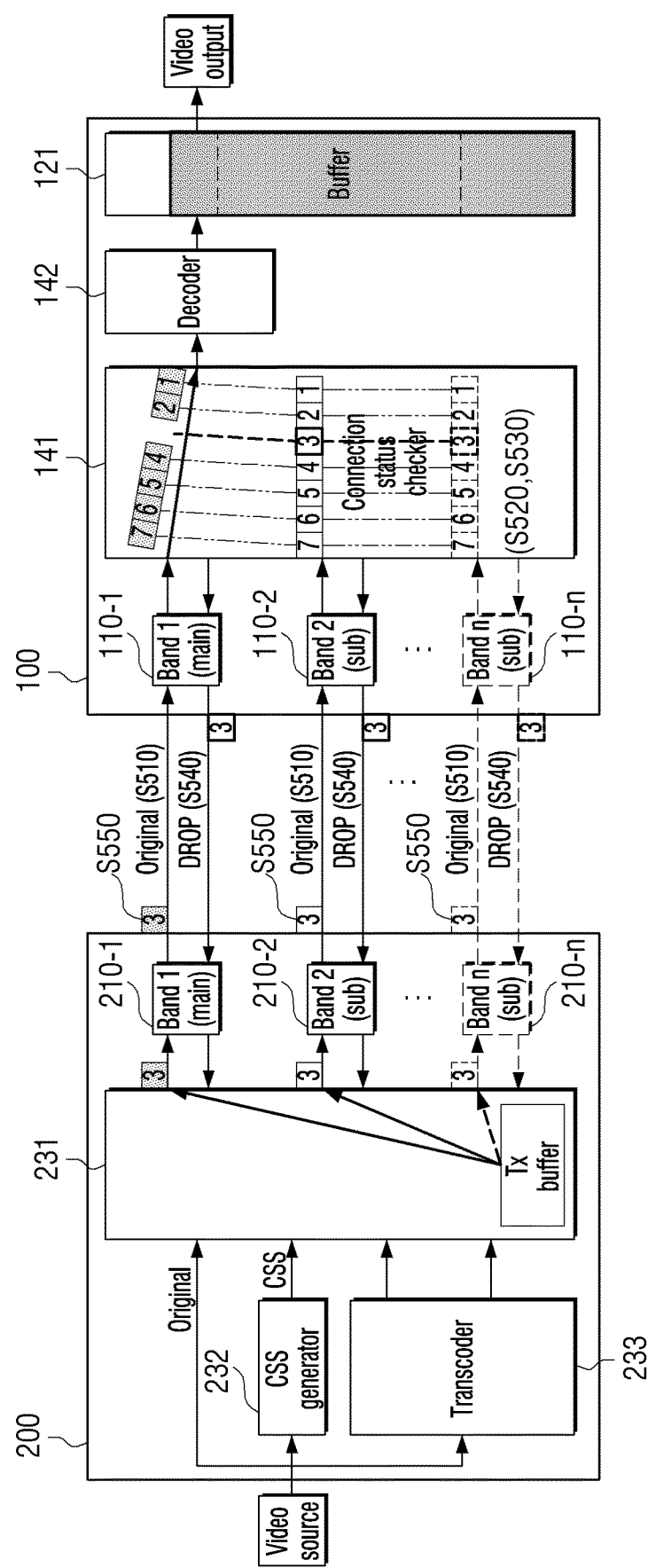

FIGS. 5C and 5D are block diagrams to describe a process between the receiving electronic device 100 and the transmitting electronic device 200.

Referring to FIG. 5C, the transmitting electronic device 200 may receive data on the contents (a video source in the drawing) from an external source, e.g., an external base station 10. In FIG. 5C, the data on the contents is represented by a bit string having the order of 7, 6, 5, 4, 3, 2, and 1, but this is merely exemplary. The CSS for the original data may be generated through the CSS generator 232. The CSS may include information for identifying the bit strings included in the original data. That is, as shown in FIG. 5C, the CSS may include identification information for identifying each of the bit strings 7, 6, 5, 4, 3, 2, and 1 of the original data.

In the meantime, the sub band is a band to brace for a situation where communication of the main band is not smooth. As illustrated in the drawings, the sub band may use a plurality of bands. The original data may be transmitted through a main band 110-1, and the CSS may be transmitted to the receiving electronic device 100 through sub bands 110-2 to 110-n.

The communication connection checker 141 may determine whether the original data is missing by combining the received original data and the CSS. The communication connection checker 141 may determine that the 7, 6, 5, 4, 3, 2, and 1 bit strings of the original data are received without any missing data, as shown in FIG. 5C, and generate an ACK signal indicating that the original data has been normally received through the main band 110-1. The receiving electronic device 100 may transmit the generated ACK signal to the transmitting electronic device 200 through the main band 110-1 and the sub bands 110-2 to 110-n.

When receiving the ACK signal through the main band 110-1, the transmitting electronic device 200 may determine that the communication connection of the main band 110-1 is smooth again and that the transmission rate is increased, transmit data of the next part other than the original data through the main band 110-1, and transmit the CSS for the original data to be transmitted through the main band to the receiving electronic device 100 through the sub bands 110-2 to 110-n.

Referring to FIG. 5D, the communication connection checker 141 may compare the CCS received through the sub bands 110-2 to 110-n with the original data received through the main band 110-1, and check that some data corresponding to 3 out of the original data (7, 6, 5, 4, 3, 2, and 1) is missing. In this case, the receiving electronic device 100 may transmit a drop signal to the transmitting electronic device 200 using both the main band and the sub band to notify that a part of the original data is missing. As illustrated in FIG. 5D, the drop signal may include information identifying the missing part (e.g., indicating that the data 3 is missing), and the transmitting electronic device 200 may transmit, to the receiving electronic device 100, the missing data 3 through the main band and the sub band based on the drop signal.

Figure 5E:
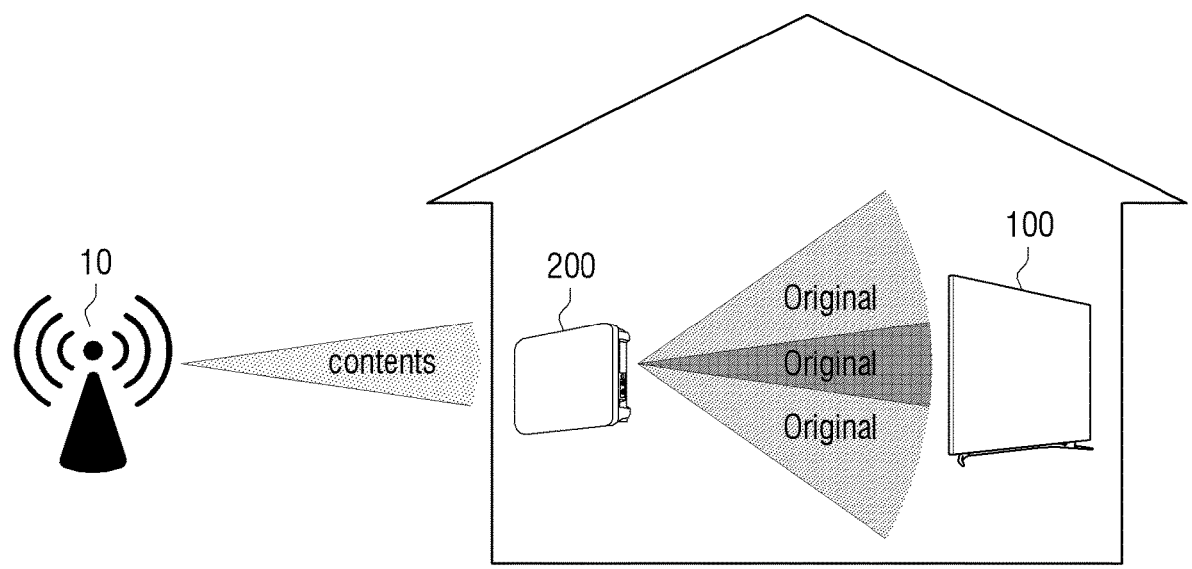

For example, referring to FIG. 5E, the transmitting electronic device 200 that has received the drop signal may transmit, to the receiving electronic device 100, the data of the missing part of the original data included in the drop signal through both the main band and the sub band.

By the aforementioned embodiments, there is an effect that the transmitting electronic device 200 may not only recognize that some of the original data is missing and retransmit the missing data, but also continue to check the communication connection state of the main band.

FIGS. 6A, 6B, 6C, and 6D are views to describe a process that is performed between electronic devices 100 and 200 when a buffer amount of data is not sufficient according to an embodiment.

Figure 6A:
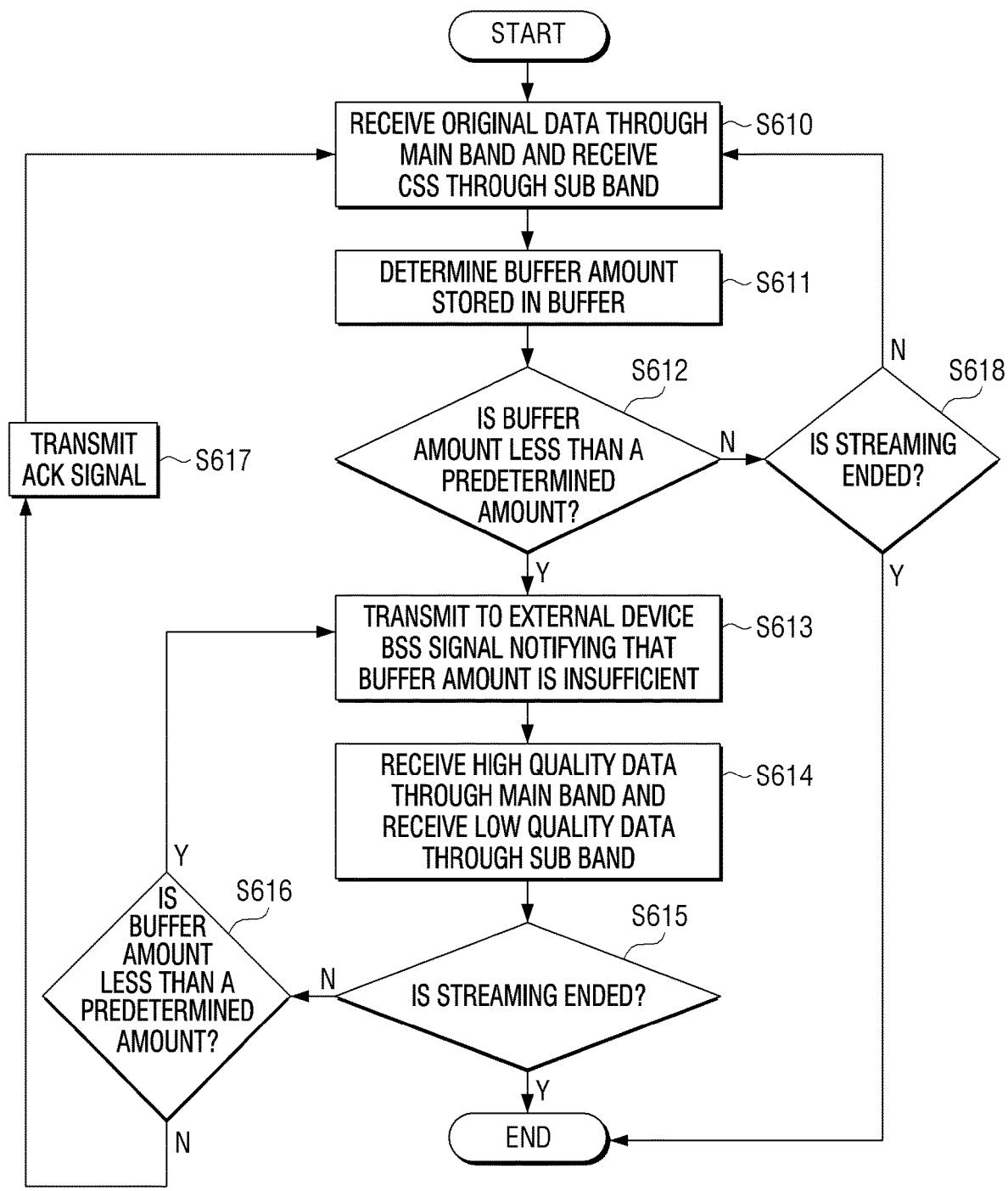
FIGS. 6A, 6B, 6C, and 6D are views to describe a process that is performed between electronic devices when a buffer amount of data is not sufficient according to an embodiment.

FIG. 6A is a flowchart to describe a process performed by the receiving electronic device 100 when the buffer amount of data is not sufficient.

The receiving electronic device 100, when streaming or downloading the contents, may receive the data of the contents from the outside. In particular, the receiving electronic device 100 may receive the original data of the contents through the main band (or main frequency band) from the transmitting electronic device 200 and receive the CSS through the sub band (or sub frequency band) in operation S610.

In the meantime, the receiving electronic device 100 may determine the buffer amount of the data stored in the buffer in operation S611. When it is determined that the buffer amount of the data stored in the buffer 121 is less than a predetermined quantity in operation S612-Y, the receiving electronic device 100 may transmit, to the transmitting electronic device 200 (or external device), the BSS notifying that the buffer amount is not sufficient through both the main band and the sub band in operation S613.

Thereafter, the receiving electronic device 100 may receive high quality data that is obtained by transcoding (or encoding) the original data of the contents through the main band, and receive low quality data obtained by transcoding the original data through the sub band in operation S614. In this case, the high quality data may not be reproduced solely without the low quality data, and may be the data for reproducing the high quality contents by improving the image quality based on the low quality data. Accordingly, even when the wireless network communication of the main band is unstable, the receiving electronic device 100 may receive the low quality data through the sub band, so that the buffer amount in the buffer may be maintained at a predetermined level or higher to provide streaming reproduction without disconnection.

In the meantime, when the streaming of the contents is not ended in operation S615-N, the receiving electronic device 100 may continue to check the buffer amount for the data of the contents in the buffer. If it is determined that the buffer amount for the contents is greater than the predetermined amount in operation S616-N, the receiving electronic device 100 may transmit the ACK signal to the transmitting electronic device 100 in operation S617, and receive the original data of the contents through the main band (or main frequency band) from the transmitting electronic device 200 again, and receive the CSS through the sub band (or sub frequency band) in operation S610. Similarly, when it is determined that the streaming of contents is not ended in operation S618-N, the process repeats itself starting at operation S610.

Figure 6B:
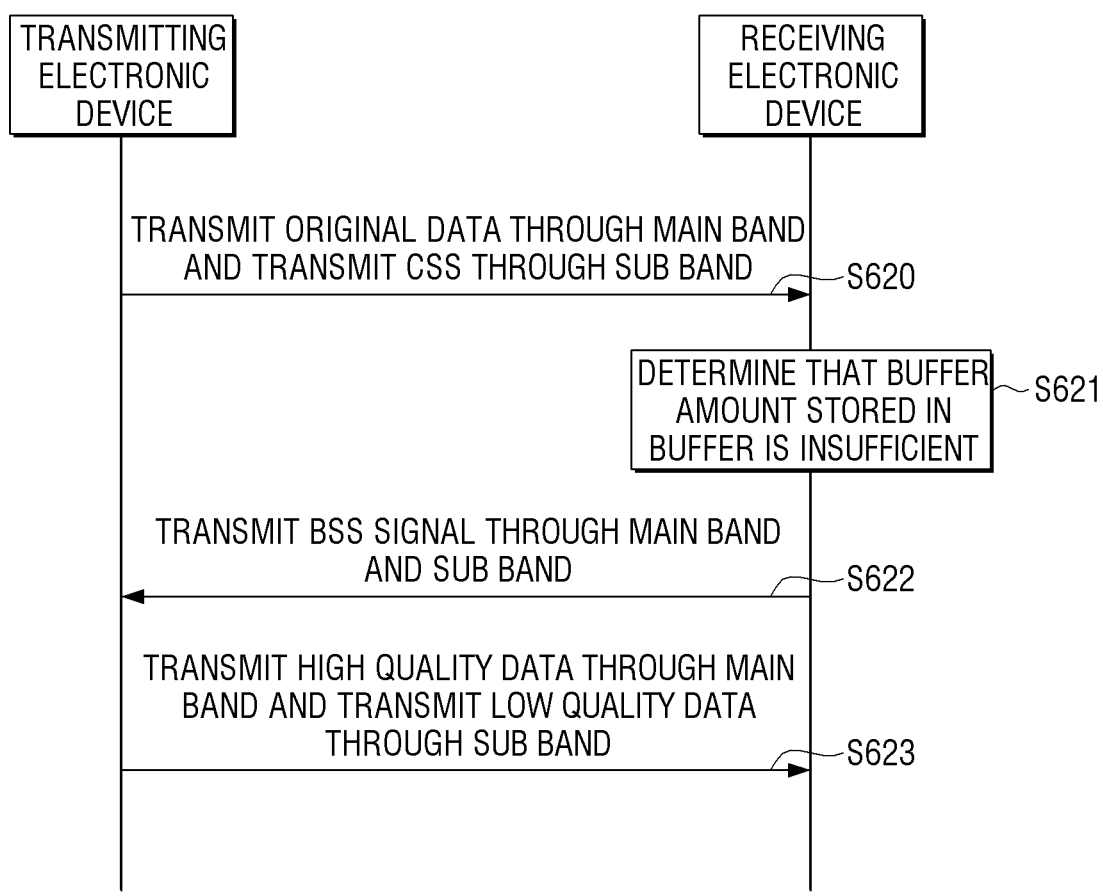

FIG. 6B is a sequence map to describe a process performed by the receiving electronic device when the buffer amount of data is not sufficient (e.g., less than a predetermined value).

The transmitting electronic device 200 may transmit the original data of the contents through the main band to the receiving electronic device 100, and may transmit the CSS related to the original data through the sub band in operation S620. In the meantime, the receiving electronic device 100 may determine whether the buffer amount stored in the buffer (e.g., the amount of original data stored in the buffer) is less than the predetermined amount. Here, the receiving electronic device 100 may determine that the buffer amount of the data stored in the buffer is insufficient when the buffer amount is less than the predetermined amount in operation S621. The receiving electronic device 100 may transmit, to the transmitting electronic device 200, the BSS signal to notify that the buffer amount stored in the buffer is insufficient through both the main band and the sub band.

The transmitting electronic device 200 receiving the BSS signal may determine that the transmission of the original data through the main band is not continuously smooth (e.g., unstable). Accordingly, the transmitting electronic device 200 may transmit the high quality data that is obtained by transcoding the original data through the main band, instead of the original data requiring the high transmission rate. In the meantime, the high quality data may not be independently reproduced, but the contents may be reproduced based on both the high quality data and the low quality data. The transmitting electronic device 200 may transmit the low quality data that is obtained by transcoding the original data to the receiving electronic device 100 through the sub band in operation S623. The sub band has a lower transmission rate than the main band, but may have a smoother (e.g., more stable) connection than the main band. Accordingly, even when the wireless network of the main band is unstable, the receiving electronic device 100 that continuously receives the low quality data through the sub band may maintain the data buffer amount stored in the buffer to a certain level or more, and provide a user with streaming reproduction without disconnection. That is, the receiving electronic device 100 may maintain the reproduction of the contents with only the low quality data transmitted through the sub band, and if the high quality data is received normally through the main band, the receiving electronic device 100 may reproduce the high quality contents.

Figure 6C:
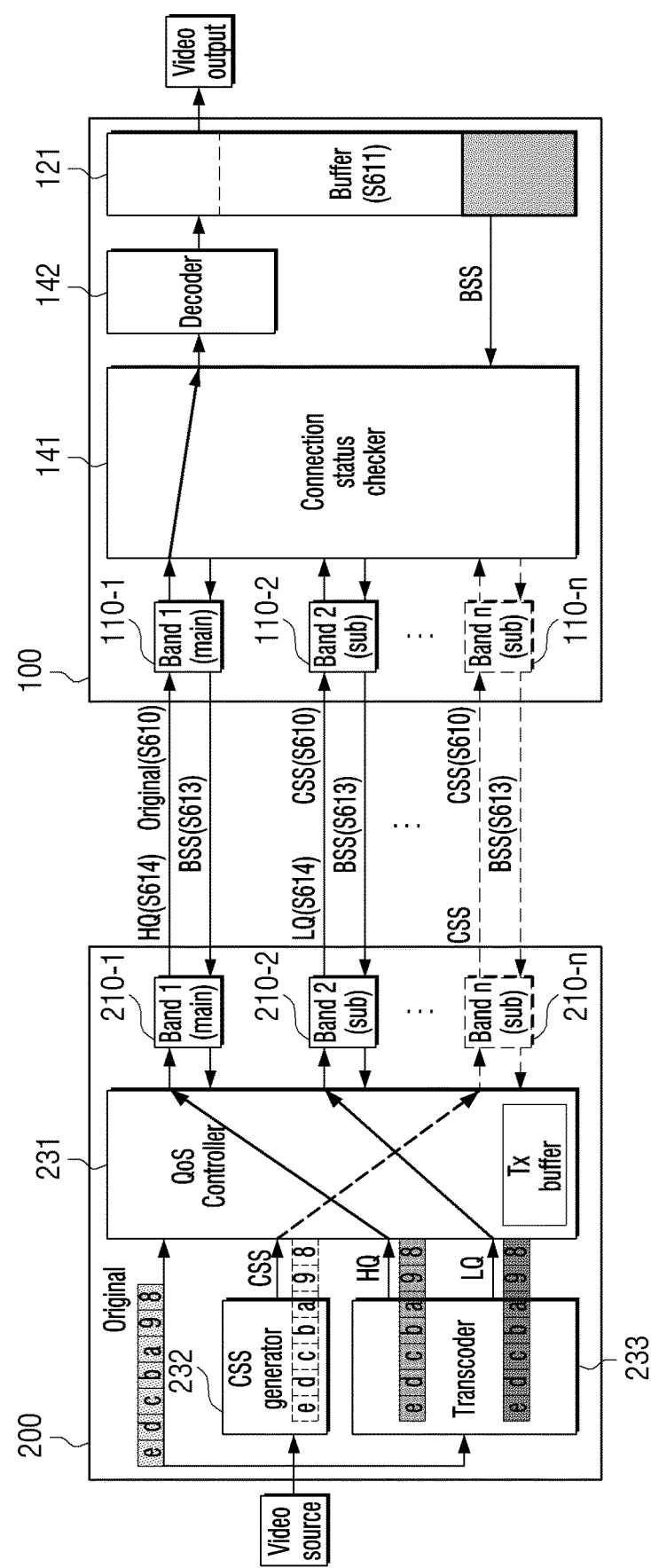

FIG. 6C is a block diagram to describe a process performed by the receiving electronic device 100 when the buffer amount of data is not sufficient (e.g., when the amount of streaming contents data stored in the buffer is determined to be below a predetermined value).

The receiving electronic device 100 may receive the original data from the transmitting electronic device 200 through the main band, and receive the CSS through the sub band. FIG. 6C illustrates the data of the contents as e, d, c, b, a, 9, and 8 bit strings, but this is merely exemplary.

The receiving electronic device 100 may determine whether the buffer amount of the data stored in the buffer 121 is less than a predetermined amount. When it is determined that the buffer amount is less than the predetermined amount, the receiving electronic device 100 may transmit the BSS to the transmitting electronic device 200 using both the main band and the sub band.

The transmitting electronic device 200 receiving the BSS may determine that the transmission of the original data through the main band is not continuously smooth or stable. Therefore, for streaming reproduction without disconnection, as illustrated in FIG. 6C, the transmitting electronic device 200 may transcode the original data (e, d, c, b, a, 9, and 8) to the high quality data and low quality data through the transcoder 233, transmit the low quality data to the receiving electronic device 100 through the sub band, and transmit the high quality data through the main band.

According to an embodiment, the transmitting electronic device 200 may transmit the CSS including information on the low quality data and high quality data transmitted to the receiving electronic device 100, through a specific sub band 210-n. In this case, the receiving electronic device 100 may determine whether data is missing by combining the data of the received contents with the CSS. If it is determined that a portion of the data is missing, the receiving electronic device 100 may receive, from the transmitting electronic device 200, the missing data portion through the drop signal, as described above with reference to FIGS. 5A to 5D.

Figure 6D:
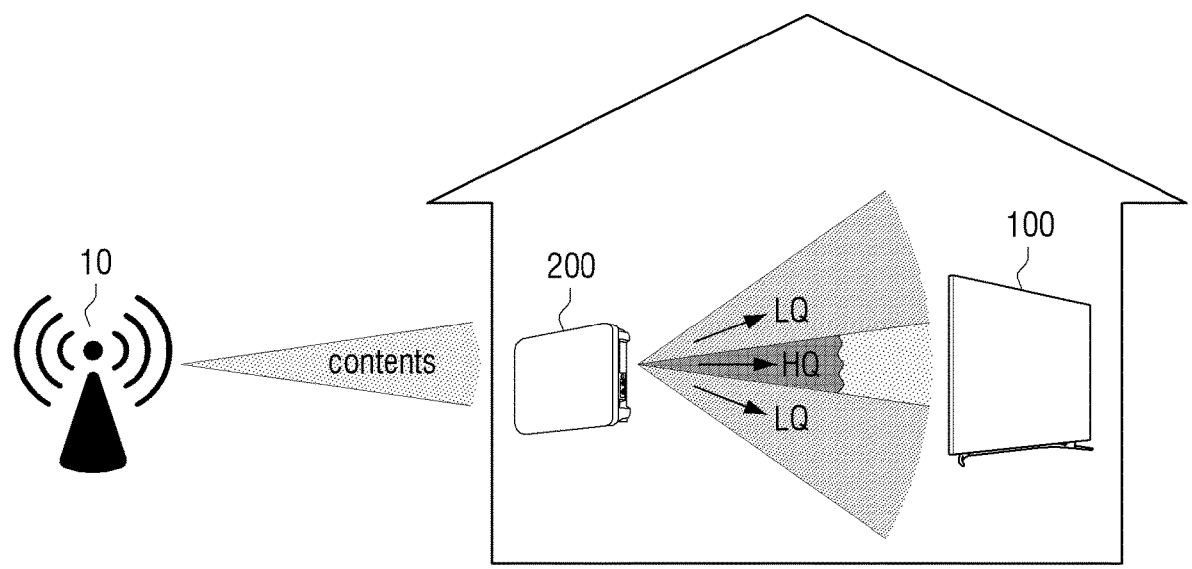

For example, referring to FIG. 6D, when the communication through the main band is not continuously smooth, the transmitting electronic device 200 receiving the BSS may transcode the original data for streaming reproduction without disconnection, and transmit, to the receiving electronic device 100, the low quality data (LQ) through the sub band and high quality data (HQ) through the main band.

According to the present embodiment, the transmitting electronic device 200 may receive a signal according to an insufficient buffer amount in the receiving electronic device 100, check the connection state for the main band, and prevent disconnection of streaming by appropriately transmitting data through the sub band.

Figure 7A:
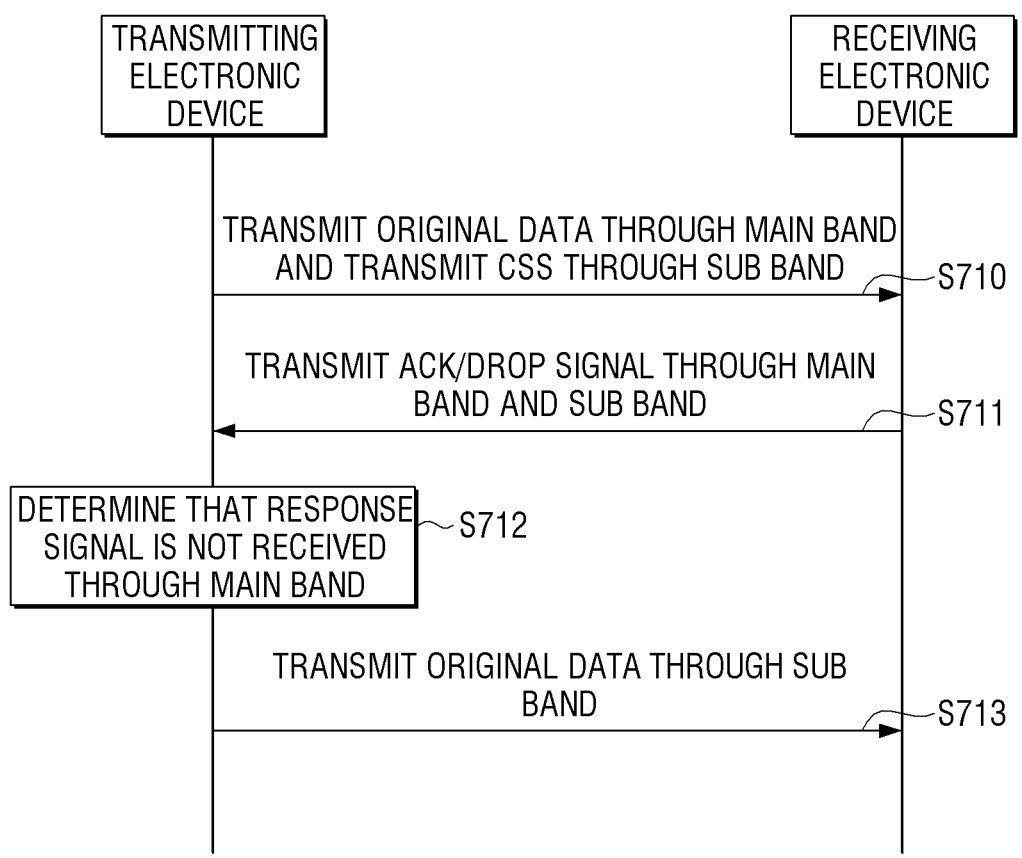
FIGS. 7A, 7B, and 7C are views to describe a process that is performed between electronic devices when a main frequency band is disconnected according to an embodiment.
Figure 7B:
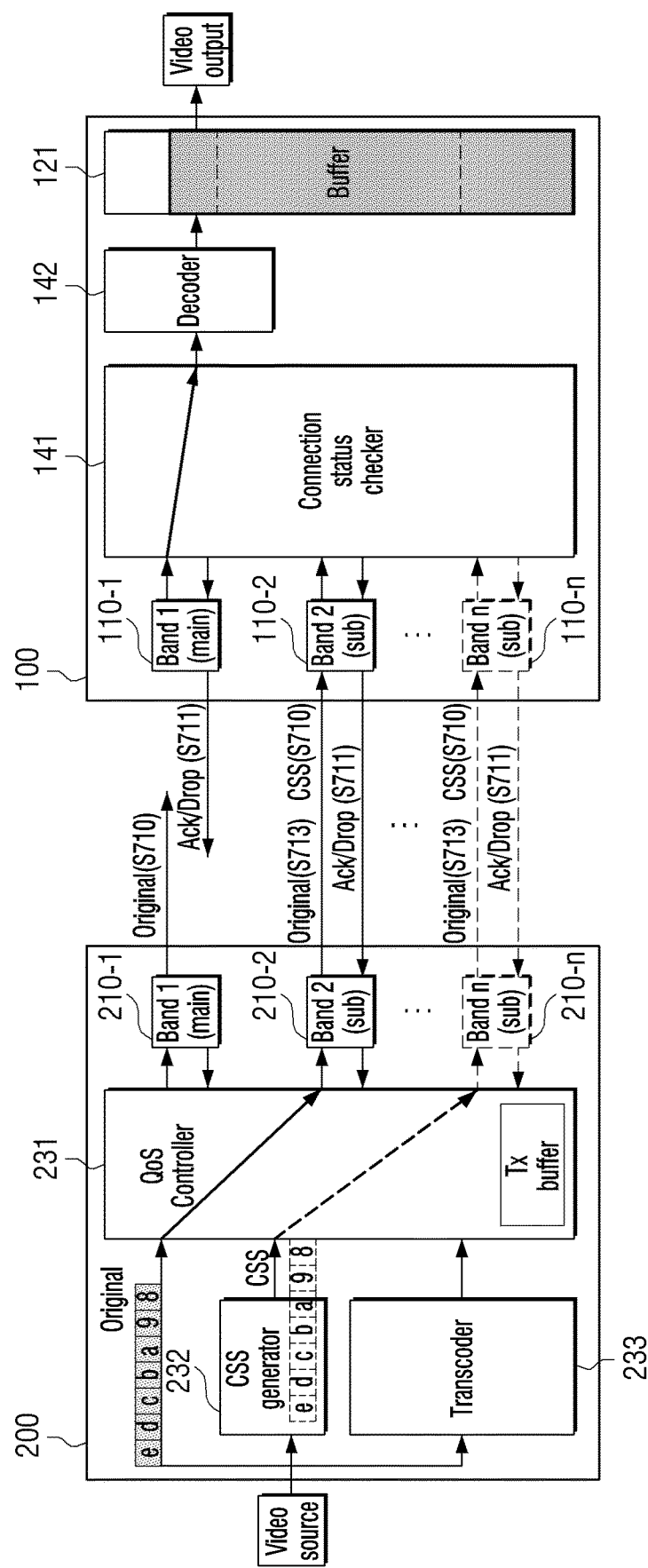
Figure 7C:
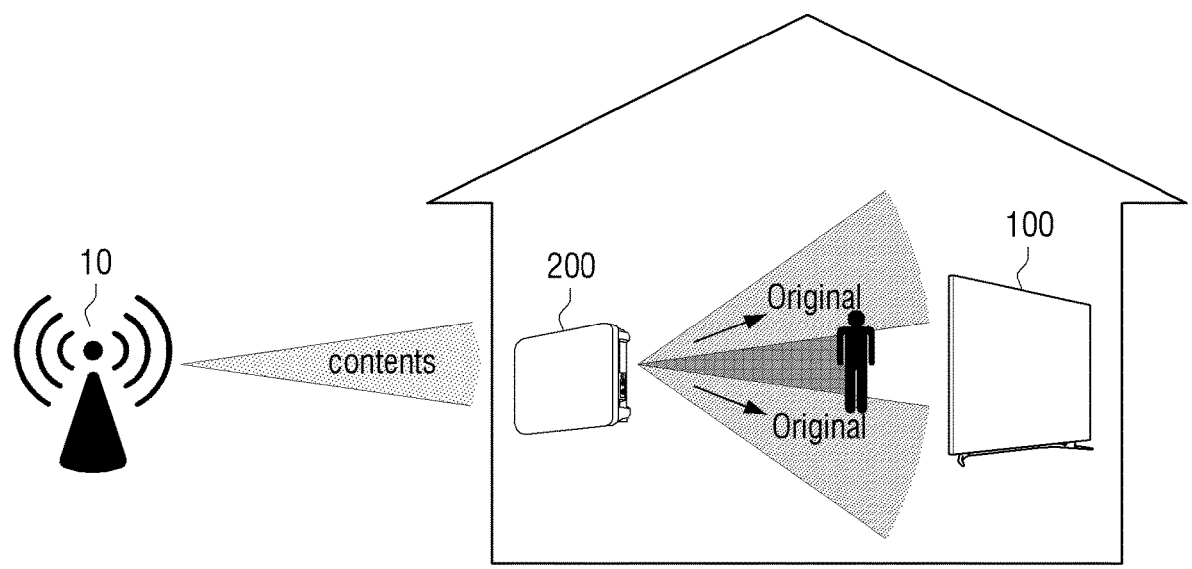

FIGS. 7A, 7B, and 7C are views to describe a process that is performed between the electronic devices when the main frequency band is disconnected according to an embodiment.

FIG. 7A is a sequence map to describe a process that is performed between the electronic devices 100 and 200 when the main band is disconnected.

The transmitting electronic device 200 may transmit, to the receiving electronic device 100, the original data of the contents through the main band, and transmit the CSS related to the original data through the sub band in operation S710. The receiving electronic device 100 may determine whether a part of the original data is missing by combining and comparing the received original data and the CSS. If it is determined that a part of the original data is missing, the receiving electronic device 100 may transmit the drop signal using both the main band and the sub band to the transmitting electronic device 200 in operation S711. When the receiving electronic device 100 determines that the original data for the content has been received without missing any data, the receiving electronic device 100 may transmit a response signal (ACK signal) to the transmitting electronic device 200 to notify that the content data receiving has been normally performed in operation S711. At this time, the receiving electronic device 100 may transmit the ACK signal using both the main band and the sub band.

When the ACK or drop signal is received through the sub band, but not the main band, from the receiving electronic device 100, the transmitting electronic device 200 may determine that the wireless network connection through the main band is disconnected in operation S712. In this case, the transmitting electronic device 200 may transmit the original data of the contents to the receiving electronic device 100 through the sub band to provide the streaming contents without disconnection in operation S713.

In the meantime, while the transmitting electronic device 200 is determining that the main band is disconnected and transmitting the original data through the sub band, the transmitting electronic device 200 may receive, from the receiving electronic device 100, the BSS signal indicating that the buffer amount is not sufficient through the sub band. In this case, the transmitting electronic device 200 may determine that the transmission rate through the sub band is not enough for normal transmission of the original data, and transmit low quality data of the contents through the sub band.

In addition, while transmitting low quality data of the contents through the sub band, when the transmitting electronic device 200 receives the ACK signal from the receiving electronic device 100, the transmitting electronic device 200 may determine that the buffer amount in the receiving electronic device 100 is no longer insufficient. At this time, when the ACK signal is received only through the sub band, the transmitting electronic device 200 may determine that the main band is still disconnected, and transmit the original data of the contents through the sub band.

In contrast, when the ACK signal is received through both the main band and the sub band, the transmitting electronic device 200 may determine that the communication of the main band is reconnected. In this case, the transmitting electronic device 200 may transmit the original data through the main band, and transmit the CSS through the sub band.

In the meantime, when the BSS signal is received through the main band and the sub band, the transmitting electronic device 200 may determine that the communication of the main band is reconnected, but may determine that the transmission through the main band is not smooth or stable. In this case, the transmitting electronic device 200 may not normally transmit the original data through the main band, and may determine that the buffer amount in the receiving electronic device 100 is currently insufficient (e.g., insufficient to maintain continuous reproduction). Accordingly, the transmitting electronic device 200 may transmit the low quality data through the sub band and the high quality data through the main band.

According to one or more embodiments as described above, even if the connection with the receiving electronic device 100 through the main band is disconnected, or the transmission rate of the sub band is not sufficient, the transmitting electronic device 200 may provide streaming contents without disconnection by controlling the QOS to utilize the main band and the sub band in an organic manner.

As described with reference to FIGS. 5A to 5E and 6A to 6D, the receiving electronic device 100 receiving the original data of the contents may transmit, to the transmitting electronic device 200, the response signal (e.g., ACK, DROP) including information on received data through both the main band and the sub band. The transmitting electronic device 200 may determine that the main band wireless network is reconnected based on receiving the response signal through the main band while transmitting the original data only through the sub band. In this case, the transmitting electronic device 200 may, again, transmit the original data of the contents through the main band and transmit the CSS related to the original data through the sub band.

FIG. 7B is a block diagram to describe a process that is performed between the electronic devices 100 and 200 when the main band is disconnected.

Referring to FIG. 7B, the transmitting electronic device 200 may transmit the original data of the contents through the main band and transmit the CCS through the sub band. Thereafter, the receiving electronic device 100 may transmit, to the transmitting electronic device 200, the response signal (e.g., ACC, BSS, and DROP) including at least one of the status of data received by the receiving electronic device 100 and the information on the buffer amount to the transmitting electronic device 200 through both the main band and the sub band.

When the transmitting electronic device 200 does not receive the response signal transmitted from the receiving electronic device 100 through the main band, but only through the sub band, the transmitting electronic device 200 may determine that the main band is disconnected. The QOS controller 231 of the transmitting electronic device 200 may transmit the original data to the receiving electronic device 100 through the sub band for streaming of the contents without disconnection.

For example, referring to FIG. 7C, when the main band that uses frequency with strong straightness such as the WiGig is disconnected by an obstacle such as a human, the transmitting electronic device 200 may transmit the original data to the receiving electronic device 100 through the sub band for streaming of the contents without disconnection.

According to still another embodiment, the CSS that includes information on the original data transmitted through another sub band may be transmitted through one sub band, among a plurality of sub bands. In this case, the receiving electronic device 100 may determine whether the original data is missing, by combining and comparing the original data received through the sub band with the CSS.

Figure 8A:
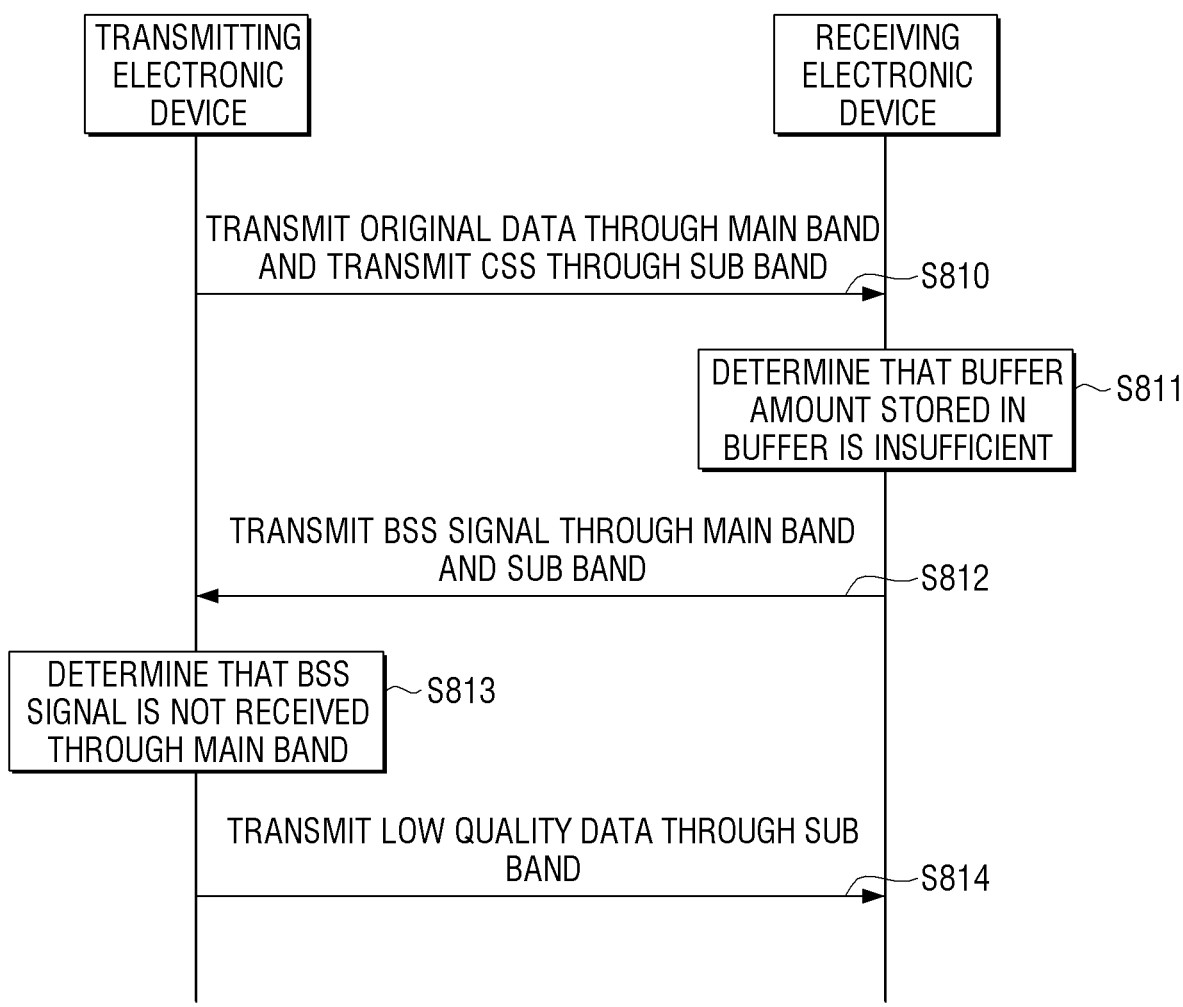
FIGS. 8A, 8B, and 8C are views to describe a process that is performed between electronic devices when a buffer amount in a receiving electronic device is not sufficient when a main band is disconnected.
Figure 8B:
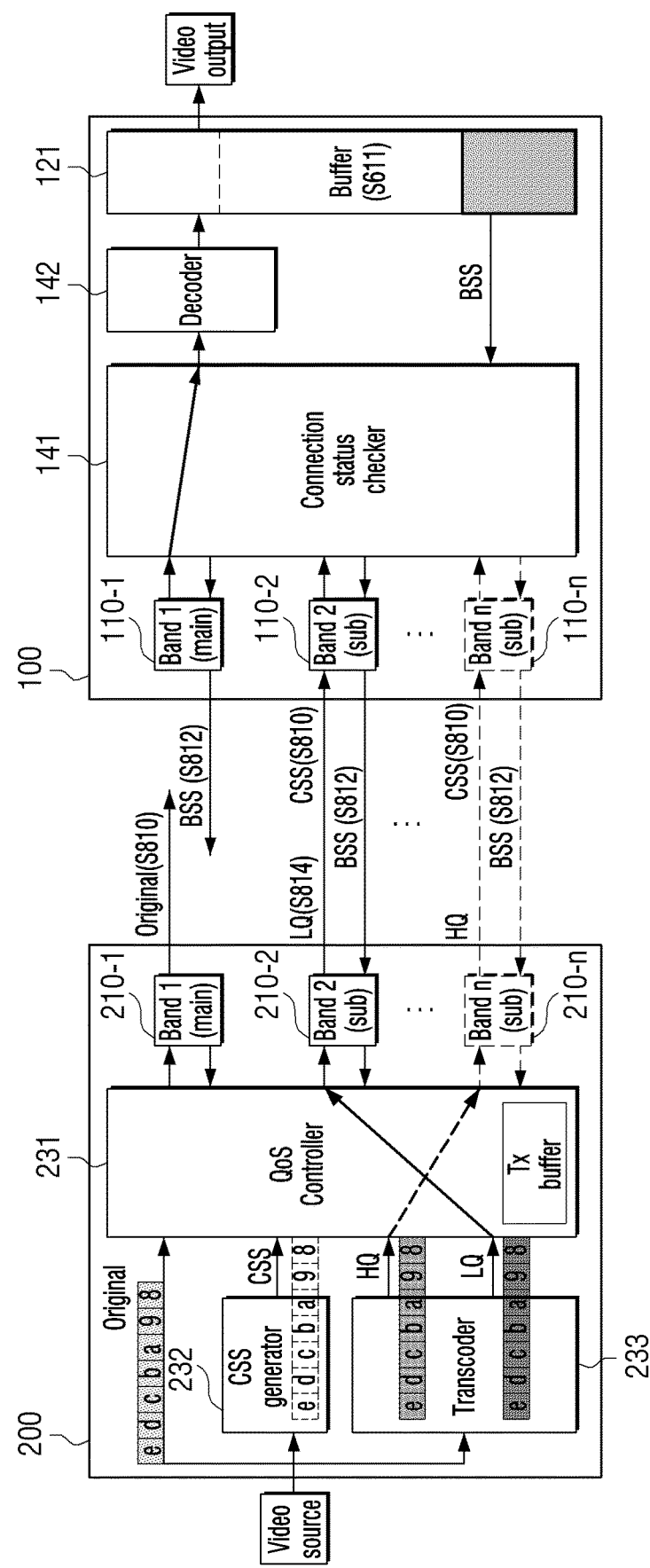
Figure 8C:
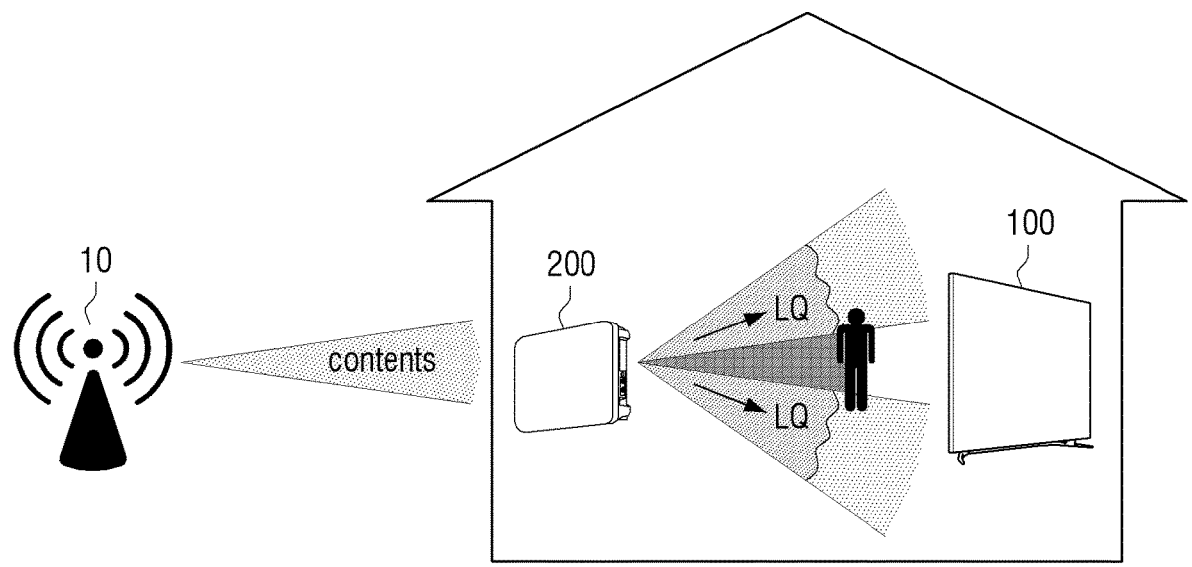

FIGS. 8A, 8B, and 8C are views to describe a process that is performed between the electronic devices 100 and 200 when the buffer amount in the receiving electronic device 100 is not sufficient when the main band is disconnected.

Referring to FIG. 8A, the transmitting electronic device 200 may transmit, to the receiving electronic device 100, the original data of the contents through the main band, and transmit the CSS through the sub band in operation S810.

In the meantime, the receiving electronic device 100 may determine that the buffer amount of the data in the buffer 121 is less than a predetermined amount. When the receiving electronic device 100 determines that the buffer amount of the data is less than a predetermined amount in operation S811, the receiving electronic device 100 may transmit, to the transmitting electronic device 200, the BSS through both the main band and the sub band in operation S812.

If the transmitting electronic device 200 determines that the BSS is not received through the main band but received only through the sub band in operation S813, the transmitting electronic device 200 may determine that the main band is disconnected. In this case, the transmitting electronic device 200 may transmit data for the contents through the sub band for streaming without disconnection. However, if data transmission to the receiving electronic device 100 is slow in a state where the buffer amount in the receiving electronic device 100 is currently insufficient, the streaming may be disconnected. Considering that the sub band is a frequency band having a relatively low transmission speed as compared with the main band, when the transmitting electronic device 200 transmits the original data of the contents through the sub band, it may not be possible that the data buffer amount in the receiving electronic device 100 increases to more than a predetermined amount.

Therefore, as illustrated in FIG. 8A, if it is determined that the main band is in a disconnected state, and the buffer amount in the receiving electronic device 100 is not sufficient, the transmitting electronic device 200 may transmit the low quality data of the contents through the sub band in operation S814.

FIG. 8B is a block diagram to describe a process that may be performed between the electronic devices 100 and 200 if it is determined that the buffer amount in the receiving electronic device 100 is not sufficient in the situation where the main band is disconnected, according to an embodiment.

Referring to FIG. 8B, the receiving electronic device 100 may receive original data and the CSS through the main band and the sub band from the transmitting electronic device 200, and determine whether the buffer amount in the buffer 121 is sufficient. If it is determined that the buffer amount of the data of the contents is less than a predetermined amount, the receiving electronic device 100 may transmit the BSS to the transmitting electronic device 200 using both the main band and the sub band.

When the BSS signal is received only through the sub band, the transmitting electronic device 200 may determine that the communication through the main band is disconnected. In addition, the transmitting electronic device 200 may recognize that the buffer amount in the receiving electronic device 100 is insufficient, and transmit low quality data of the contents only through the sub band by controlling the QOS controller 231 for controlling of the contents streaming without disconnection.

While the transmitting electronic device 200 is transmitting the low quality data through the sub band and transmitting the high quality data through the main band on the grounds that the transmission rate of the main band is deteriorated, if the BSS signal is received only through the sub band as described above, it may be determined that the communication connection through the main band is disconnected. In this case as well, the transmitting electronic device 200 may recognize that the buffer amount in the receiving electronic device 100 is insufficient, and transmit the low quality data of the contents only through the sub band by controlling the QOS controller 231 for control of the contents streaming without disconnection.

For example, referring to FIG. 8C, if the main band that uses the frequency with high straightness such as WiGig is disconnected by an obstacle such as a human and communication connection through the sub band is not smooth (e.g., unstable), the transmitting electronic device 200 receiving the BSS signal may recognize that the buffer amount in the receiving electronic device 100 is not sufficient, and transmit the low quality data (LQ) of the contents through only the sub band.

According to an embodiment, the transmitting electronic device 200 may transmit high quality data of the contents through one sub band from among a plurality of sub bands at the same time as transmitting low quality data through the same or another sub band.

According to still another embodiment, the transmitting electronic device 200 may transmit the CSS including the information of the data of the contents through one sub band from among a plurality of sub bands, at the same time as transmitting low quality data through the same or another sub band.

In the meantime, when receiving the ACK signal from the receiving electronic device 100 while transmitting low quality data for the contents through the sub band, the transmitting electronic device 200 may determine that the buffer amount in the receiving electronic device 100 is no longer insufficient. At this time, when the ACK signal is received through only the sub band, the transmitting electronic device 200 may determine that the main band is still disconnected and transmit the original data of the contents through the sub band.

In contrast, when the ACK signal is received through both the main band and the sub band, the transmitting electronic device 200 may determine that the communication of the main band is reconnected. In this case, the transmitting electronic device 200 may transmit the original data through the main band, and transmit the CSS through the sub band.

Through the aforementioned embodiment, the transmitting electronic device 200 may rapidly recognize a situation in which the main band is disconnected, and provide data transmission without disconnection in accordance with transmission of low quality data, or the like, through the sub band in consideration of the transmission rate of the sub band.

Figure 9:
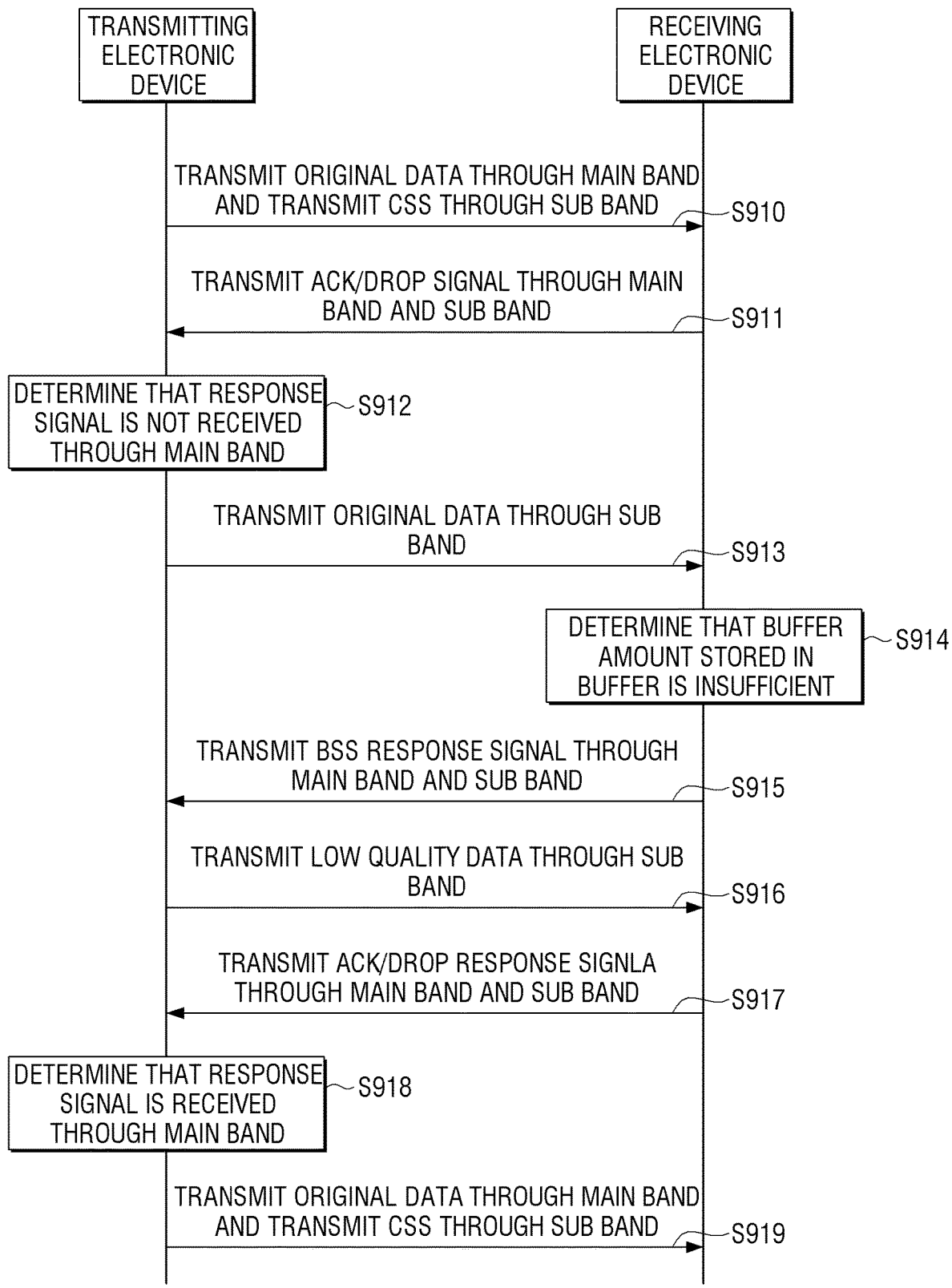
FIG. 9 is a sequence map to describe a method for changing a method for transmitting data between electronic devices for a specific situation, according to an embodiment.

FIG. 9 is a sequence map to describe a method for changing a method for transmitting data between the electronic devices 100 and 200 for a specific situation, according to an embodiment.

Referring to FIG. 9, the transmitting electronic device 200 may transmit, to the receiving electronic device 100, the original data through the main band, and transmit the CSS through the sub band in operation S910. The receiving electronic device 100 may combine, compare, or crosscheck the received original data with the CSS, and if there is no missing data, the receiving electronic device 100 may transmit the ACK signal in operation S911. Conversely, if it is determined that there is missing data, the receiving electronic device 100 may transmit the drop signal to receive the missing data by the method described in FIGS. 5A to 5E in operation S911.

When the transmitting electronic device 200 determines that the response signal transmitted by the receiving electronic device 100 is received only through the sub band without being received through the main band, the transmitting electronic device 200 may determine that the main band is disconnected in operation S912. In this case, the transmitting electronic device 200 may transmit the original data of the contents through the sub band so that the content reproduction is not disconnected or interrupted in the receiving electronic device 100 in operation S913.

While receiving the original data through the sub band, when the receiving electronic device 100 determines that the data buffer amount in the buffer is less than a predetermined amount for various reasons in operation S914, the receiving electronic device 100 may transmit the BSS signal notifying insufficient buffer amount to the transmitting electronic device 200 through the main band and the sub band in operation S915.

In this case, the transmitting electronic device 200 that has received the BSS signal only through the sub band, as the main band is still disconnected, may transmit the low quality data that is obtained by transcoding the original data through the sub band, instead of the original data in operation S916.

As a result of receiving low quality data with a sufficient speed through the sub band, if the buffer amount of data stored in the buffer is greater than or equal to a predetermined amount, the receiving electronic device 100 may transmit the ACK signal or the drop signal to the transmitting electronic device 200 using both the main band and the sub band in operation S917.

If receiving the ACK signal or the drop signal transmitted from the receiving electronic device 100 over the main band, the transmitting electronic device 200 may determine that the main band is reconnected in operation S918. In this case, the transmitting electronic device 200 may transmit the original data through the main band, and transmit the CSS to the receiving electronic device 100 through the sub band in operation S919.

In the meantime, the situation as described in FIG. 9 is merely exemplary, and the electronic device may change a transmission method by various methods depending on various situations as described below with reference to FIG. 10.

Figure 10:
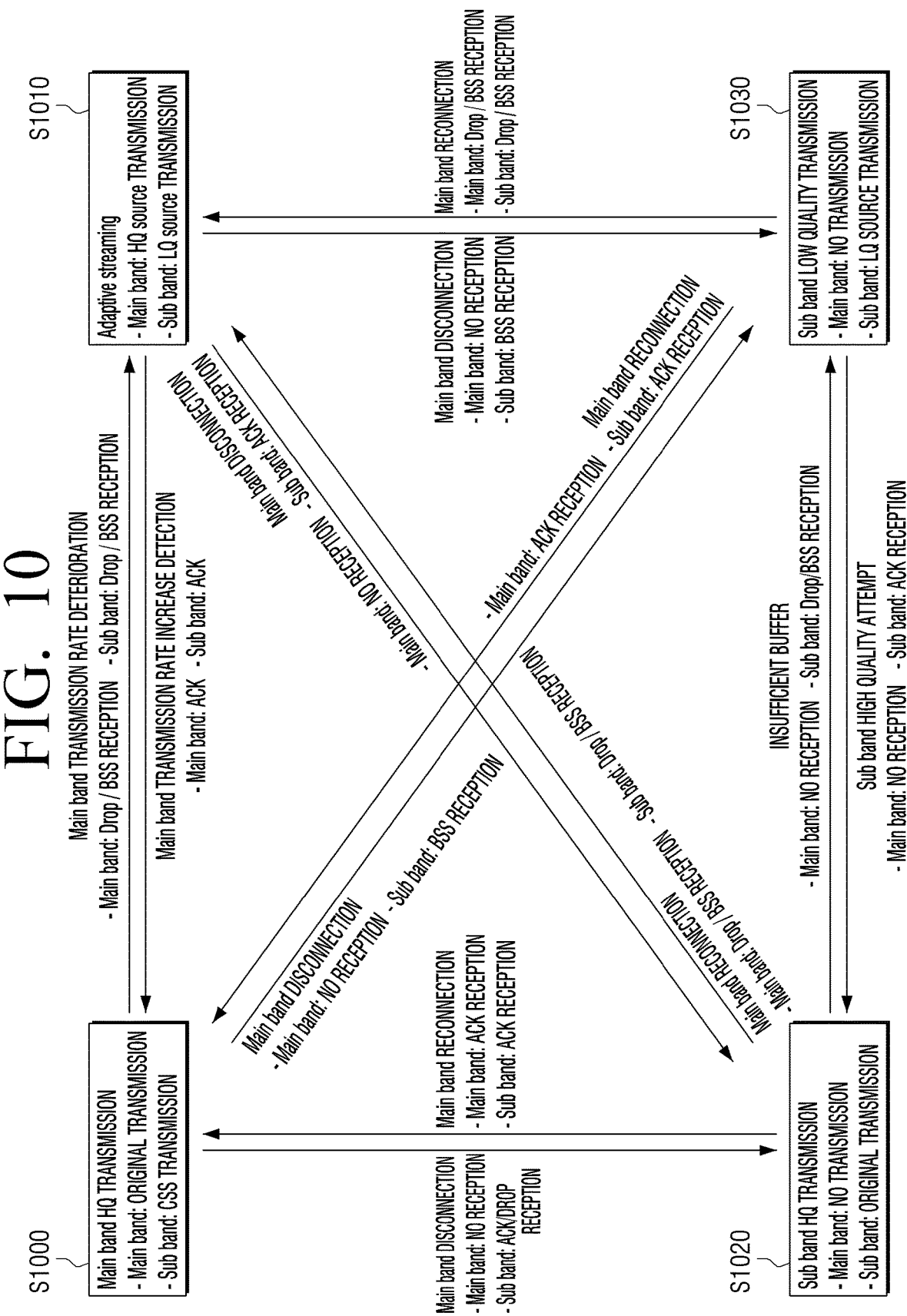
FIG. 10 is a view to describe a method for transmitting data between electronic devices for various situations according to an embodiment.

Referring to FIG. 10, the electronic devices 100 and 200 may transmit data using various methods such as: 1) a method for transmitting the original data through the main band and transmitting the CSS through the sub band in operation S1000, 2) an adaptive streaming method for, based on determining that the transmission rate of the main band is deteriorated on the various grounds that the drop signal of the main band is repeated for more than a predetermined number, or the buffer amount in the buffer is not sufficient, transmitting high quality data through the main band and transmitting low quality data through the sub band in operation S1010, 3) a method of transmitting the original data through the sub band as the main band is disconnected in operation S1020, and 4) a method of transmitting low quality data through the sub band, based on determining that the transmission rate of the sub band is deteriorated on the various grounds that the main band is disconnected or the buffer amount in the buffer is insufficient in operation S1030, or the like.

A method of QOS by the transmitting electronic device 200 so as to determine the communication connection state between the main band and the sub band through the ACK, BSS, DROP signals received from the receiving electronic device 100 and transmit the appropriate data has been already described and will not be repeated herein.

As described above, the electronic devices 100 and 200 may flexibly change the data transmission method to be suitable for various situations based on, for example, the connection state of the main band, the amount of data buffer in the receiving electronic device 100, and the like. As such, the electronic devices 100 and 200 use the main band and the sub band in an organic manner, not in an independent manner, so that the communication state of the main band may be predicted, and the contents reproduction through the sub band may be continued without disconnection until a proper timing, unlike the FST method.

While not restricted thereto, an embodiment can be implemented as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described devices 100 and 200 can include circuitry, a processor, a microprocessor, etc., and may execute a computer program stored in a computer-readable medium.

Although embodiments have been shown and described, it will be appreciated by those skilled in the art that changes may be made to these embodiments without departing from the principles and spirit of the disclosure. Accordingly, the scope of the disclosure is not to be understood as being limited to the various embodiments, but is defined, for example, by the appended claims as well as equivalents thereto.

What is claimed is:

1. A controlling method of an electronic device for receiving and reproducing contents, the method comprising:
    while receiving, from an external device through a main frequency band, a signal including original data of contents, receiving, from the external device through at least one sub frequency band, a connection state signal including information on the original data and time information according to the original data;
    identifying a reception state of the received original data based on the information included in the connection state signal;
    transmitting, to the external device through the main frequency band and the at least one sub frequency band, a response signal including information on the identified reception state of the original data; and
    receiving, from the external device and based on the response signal, at least one of a signal including first quality data of the contents and a signal including second quality data of the contents, the first quality data being a higher quality than the second quality data.

2. The controlling method of claim 1, wherein the transmitting comprises:
    based on determining that the received original data is not missing data, transmitting, to the external device through the main frequency band and the at least one sub frequency band, a first response signal to notify that the original data is received; and
    based on determining that at least some of the original data is missing, transmitting, to the external device through the main frequency band and the at least one sub frequency band, a second response signal including information on a missing part of the original data.

3. The controlling method of claim 2, further comprising:
    based on the second response signal being transmitted to the external device through the main frequency band and the at least one sub frequency band more than a predetermined number of times, receiving, from the external device, the signal including the first quality data of the contents through the main frequency band, and receiving the signal including the second quality data of the contents through the at least one sub frequency band.

4. The controlling method of claim 1, further comprising: based on data regarding the contents not being received through the main frequency band, receiving a signal including the original data of the contents through a first sub frequency band from among the at least one sub frequency band, and receiving the connection state signal including information on the original data through a second sub frequency band from among the at least one sub frequency band.

5. The controlling method of claim 4, wherein: the determining comprises determining a buffer amount of the original data stored in a buffer; and the receiving comprises, based on the determined buffer amount being less than a predetermined amount, receiving the signal including the first quality data of the contents through the first sub frequency band and receiving the signal including the second quality data of the contents through the second sub frequency band.

6. The controlling method of claim 1, wherein: the determining comprises determining a buffer amount of the original data stored in a buffer; and the transmitting comprises transmitting, to the external device through the main frequency band and the at least one sub frequency band, a response signal including information on the determined buffer amount.

7. The controlling method of claim 6, wherein, based on the determined buffer amount being less than a predetermined amount: the transmitting comprises transmitting, to the external device through the main frequency band and the at least one sub frequency band, a response signal to notify that the buffer amount is not sufficient; and the receiving comprises receiving, from the external device through the main frequency band, the signal including the first quality data of the contents, and receiving, from the external device through the at least one sub frequency band, the signal including the second quality data of the contents.

8. An electronic device for receiving and reproducing contents, the electronic device comprising:
a communicator communicable with an external device through a plurality of frequency bands; and
a processor configured to, based on a signal including original data of contents being received from the external device through a main frequency band of the communicator, and a connection state signal including information on the original data and time information according to the original data being received from the external device through at least one sub frequency band of the communicator while the signal including the original data is being received:
identify a reception state of the received original data through the main frequency band based on the information included in the connection state signal, and
control the communicator to transmit, to the external device through the main frequency band and the at least one sub frequency band, a response signal including information on the identified reception state of the original data.

9. The electronic device of claim 8, wherein the processor is further configured to:
based on determining that the received original data is not missing data, control the communicator to transmit, to the external device through the main frequency band and the at least one sub frequency band, a first response signal to notify that the original data is received; and
based on determining that at least some of the original data is missing, control the communicator to transmit, to the external device through the main frequency band and the at least one sub frequency band, a second response signal including information on a missing part of the original data.

10. The electronic device of claim 9, wherein, based on the second response signal being transmitted to the external device through the main frequency band and the at least one sub frequency band more than a predetermined number of times, a signal including first quality data of the contents is received from the external device, through the main frequency band, and a signal including second quality data of the contents is received through the at least one sub frequency band.

11. The electronic device of claim 8, wherein based on data regarding the contents not being received through the main frequency band, a signal including the original data of the contents is received through a first sub frequency band from among the at least one sub frequency band, and the connection state signal including information on the original data is received through a second sub frequency band from among the at least one sub frequency band.

12. The electronic device of claim 11, further comprising: a buffer for storing data received from the external device, wherein the processor is further configured to:
determine a buffer amount of the original data stored in the buffer, and
based on the determined buffer amount being less than a predetermined amount, receive a signal including first quality data of the contents through the first sub frequency band, and receive a signal including second quality data of the contents through the second sub frequency band.

13. The electronic device of claim 8, further comprising: a buffer for storing data received from the external device, wherein the processor is further configured to determine a buffer amount of the original data stored in the buffer, and control the communicator to transmit, to the external device through the main frequency band and the at least one sub frequency band, a response signal including information on the determined buffer amount.

14. The electronic device of claim 13, wherein the processor is further configured to, based on the determined buffer amount being less than a predetermined amount:
control the communicator to transmit, to the external device through the main frequency band and the at least one sub frequency band, a response signal to notify that the buffer amount is not sufficient; and
receive, from the external device through the main frequency band, a signal including first quality data of the contents, and receive, from the external device through the at least one sub frequency band, a signal including second quality data of the contents.

15. A controlling method of an electronic device for transmitting contents, the method comprising:
while transmitting, to an external device through a main frequency band, a signal including original data of contents, transmitting, to the external device through at least one sub frequency band, a connection state signal including information on the original data and time information according to the original data;
receiving, from the external device, a response signal including information on a reception state of the original data received by the external device; and transmitting, to the external device based on the response signal, at least one of a signal including first quality data of the contents and a signal including second quality data of the contents, the first quality data being a higher quality than the second quality data.

16. The controlling method of claim 15, wherein the transmitting the at least one of the signal including the first quality data of the contents and the signal including the second quality data of the contents comprises:
based on the response signal received from the external device being a response signal to notify that a buffer amount of original data stored in a buffer of the external device is not sufficient, transmitting, to the external device through the main frequency band, the signal including the first quality data of the contents, and transmitting, to the external device through the at least one sub frequency band, the signal including the second quality data of the contents.

17. The controlling method of claim 15, further comprising:
based on the response signal received from the external device being received through only the at least one sub frequency band, transmitting, to the external device through the at least one sub frequency band, a signal including the original data.

18. An electronic device for transmitting contents, the electronic device comprising:
a communicator communicable with an external device through a plurality of frequency bands; and
a processor configured to:
control the communicator to, while transmitting, to the external device through a main frequency band, a signal including original data of contents, transmit, to the external device through at least one sub frequency band, a connection state signal including information on the original data and time information according to the original data, and
based on a response signal including information on a reception state of the original data received by the external device being received from the external device through the communicator, control the communicator to transmit, to the external device based on the response signal, at least one of a signal including first quality data and a signal including second quality data.

19. The electronic device of claim 18, wherein based on the response signal received from the external device being a response signal for notifying that a buffer amount of the original data stored in a buffer of the external device is not sufficient, the processor is further configured to:
control the communicator to transmit, to the external device through the main frequency band, the signal including the first quality data of the contents, and transmit, to the external device through the at least one sub frequency band, the signal including the second quality data of the contents.

20. The electronic device of claim 18, wherein the processor is further configured to, based on the response signal received from the external device being received through only the at least one sub frequency band, control the communicator to transmit, to the external device through the at least one sub frequency band, a signal including the original data.

* * * * *